United States Patent
Mahapatra

(10) Patent No.: US 10,321,360 B2
(45) Date of Patent: Jun. 11, 2019

(54) LOAD BALANCING OF WIRELESS SUBSCRIBER PACKET PROCESSING OVER MULTIPLE PACKET PROCESSING CORES ON A VIRTUAL MACHINE PLATFORM

(71) Applicant: Affirmed Networks, Inc., Action, MA (US)

(72) Inventor: Asima Mahapatra, Acton, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/880,252

(22) Filed: Jan. 25, 2018

(65) Prior Publication Data

US 2018/0213440 A1   Jul. 26, 2018

Related U.S. Application Data

(60) Provisional application No. 62/450,162, filed on Jan. 25, 2017.

(51) Int. Cl.
*H04W 28/08* (2009.01)
*H04L 12/741* (2013.01)
(Continued)

(52) U.S. Cl.
CPC ............. *H04W 28/08* (2013.01); *H04L 45/74* (2013.01); *H04L 67/146* (2013.01);
(Continued)

(58) Field of Classification Search
CPC ..... H04W 28/08; H04W 76/11; H04W 88/16; H04W 80/04; H04W 8/26; H04L 45/74;
(Continued)

(56) References Cited

U.S. PATENT DOCUMENTS

2011/0320608 A1   12/2011   Nelakonda et al.

OTHER PUBLICATIONS

3GPP TS 23.236 v13.0.0, "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).

(Continued)

*Primary Examiner* — Brenda H Pham
(74) *Attorney, Agent, or Firm* — Wilmer Cutler Pickering Hale and Dorr LLP

(57) ABSTRACT

Systems and methods related to the confinement, or "pinning," of packet processing for a given wireless subscriber to a single "packet handler" core, to improve throughput in a telecommunication system and reduce the probability and incidence of cache misses. Packet header data can include a subscriber's tunnel endpoint identifier ("TED") and/or a session identifier. A load balancer core can use one or both identifiers to select a packet handler core through which the packet's bidirectional traffic will be directed. A hashing algorithm can be used to distribute multiple UEs to each of multiple packet handler cores. Other embodiments relate to differentiating between system-initiated proxy traffic and downstream UE traffic using a partitioned multiprotocol label switching ("MPLS") label space. For example, the MPLS label space can be split into a UE Pool Address Domain and a Proxy Loopback Address Domain.

20 Claims, 20 Drawing Sheets

(51) Int. Cl.
*H04W 76/11* (2018.01)
*H04L 29/08* (2006.01)
*H04L 12/723* (2013.01)
*G06F 9/50* (2006.01)
*H04W 88/16* (2009.01)

(52) U.S. Cl.
CPC .......... *H04W 76/11* (2018.02); *G06F 9/5033* (2013.01); *G06F 2209/5016* (2013.01); *H04L 45/50* (2013.01); *H04W 88/16* (2013.01)

(58) Field of Classification Search
CPC ....... H04L 67/146; H04L 45/50; H04L 47/10; H04L 2012/5631; H04L 47/15; H04L 47/2441; H04L 47/70; H04L 2012/5629; H04L 49/255; H04L 12/5601; H04L 49/309; H04L 47/621; H04L 45/54; H04L 49/3009; H04L 12/56; H04L 2012/56; G06F 9/5033
USPC ..... 370/230, 349, 395.2, 395.3, 395.31, 389
See application file for complete search history.

(56) References Cited

OTHER PUBLICATIONS

3GPP TS 23.401 V13.9.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).

International Search Report and Written Opinion issued by the European Patent Office as International Searching Authority, issued in International Application No. PCT/US2018/15276, dated Apr. 20, 2018 (21 pages).

Aggarwal, R. et al., "MPLS Upstream Label Assignment and Context-Specific Label Space", Network Working Group, Internet Engineering Task Force, IETF; Standard, Internet society (ISOC) 4, Rue Des Falaises, Geneva, Switzerland, Aug. 1, 2008 (13 pages).

3GPP TS 33.210, v.14.0.0, "3rd Generation Partnership Project; Technical Specification Group Services and System Aspects; 3G security; Network Domain Security (NDS); IP network layer security (Release 14)", 3GPP Organizational Partners, Valbonne, France, Dec. 2016 (24 pages).

3GPP TS 23.401 v.14.0.0, "3rd Generation Partnership Project; Technical Specification Group Services and System Aspects; General Packet Radio Services (GPRS) Enhancements for Evolved Universal Terrestrial Radio Access Network (E-UTRAN) Access (Release 14)", 3GPP Organizational Partners, Valbonne, France, Jun. 2016 (374 Pages).

ETSI Standard, ETSI RES 282 003 v0.8.9, "Telecommunications and Internet Converged Services and Protocols for Advanced Networking (TISPAN); Resource and Admission Control Sub-system (RACS); Functional Architecture; Release 2" (draft), Cedex, France, Oct. 2007 (143 Pages).

US 10,321,360 B2

LOAD BALANCING OF WIRELESS SUBSCRIBER PACKET PROCESSING OVER MULTIPLE PACKET PROCESSING CORES ON A VIRTUAL MACHINE PLATFORM

CROSS REFERENCE TO RELATED APPLICATIONS

This application claims priority to U.S. Provisional Application No. 62/450,162, filed Jan. 25, 2017, which is incorporated herein by reference.

TECHNICAL FIELD

Embodiments of the invention generally relate to telecommunications systems and, in particular, to the processing and routing of data packets in communication systems.

BACKGROUND

When data files are transported through a telecommunications network, they can be broken up into data "packets" which are routed from a source to a destination for processing. With increases in the complexity of packet network applications, the use of multiple processor core architectures ("multi-core networks") has become increasingly prevalent.

SUMMARY OF THE INVENTION

In accordance with the disclosed subject matter, systems and methods are provided for sending packets to a packet handler core in a communications system. In some embodiments, the disclosed subject matter includes a computing device for receiving a request corresponding to a subscriber to create a session. In some embodiments, the computing device allocates a downstream identifier and an upstream identifier to the session and associates a session identifier to the session. In some embodiments, the session identifier uniquely identifies the session associated with the subscriber. In some embodiments, the computing device receives a data packet including the downstream identifier or the upstream identifier and identifies the session identifier associated with the data packet based on the received downstream identifier or upstream identifier. In some embodiments, the computing device then routes the data packet to a packet handler core based on the session identifier.

In some embodiments, the upstream identifier includes a Tunnel Endpoint Identifier ("TEID") or an encryption key. In some embodiments, the processor may encrypt or decrypt the data packet using the encryption key. In some embodiments, the downstream identifier includes a user equipment ("UE") Internet Protocol ("IP") address or a TEID. In some embodiments, the upstream identifier and downstream identifier share a common value. For example, the common value may comprise a first 24 bits of the upstream identifier and the downstream identifier. In some embodiments, the processor may apply a hashing algorithm to the session identifier to determine the packet handler core. In some embodiments, the processor may identify a proxy service for the data packet, route the data packet to a proxy service module and correlate an identifier for the packet handler core with the session identifier. In some embodiments, the processor may route the data packet to the packet handler core based on the identifier for the packet handler core.

In some embodiments, system-initiated proxy traffic may be differentiated from downstream subscriber traffic using a partitioned multi-protocol label switching ("MPLS") label space. In some embodiments, the MPLS space may be split into a UE Pool Address Domain and a Proxy Loopback Address Domain.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

For a more complete understanding of various embodiments of the disclosed subject matter, reference is now made to the following descriptions taken in connection with the accompanying drawings in which.

DETAILED DESCRIPTION

Figure 1:
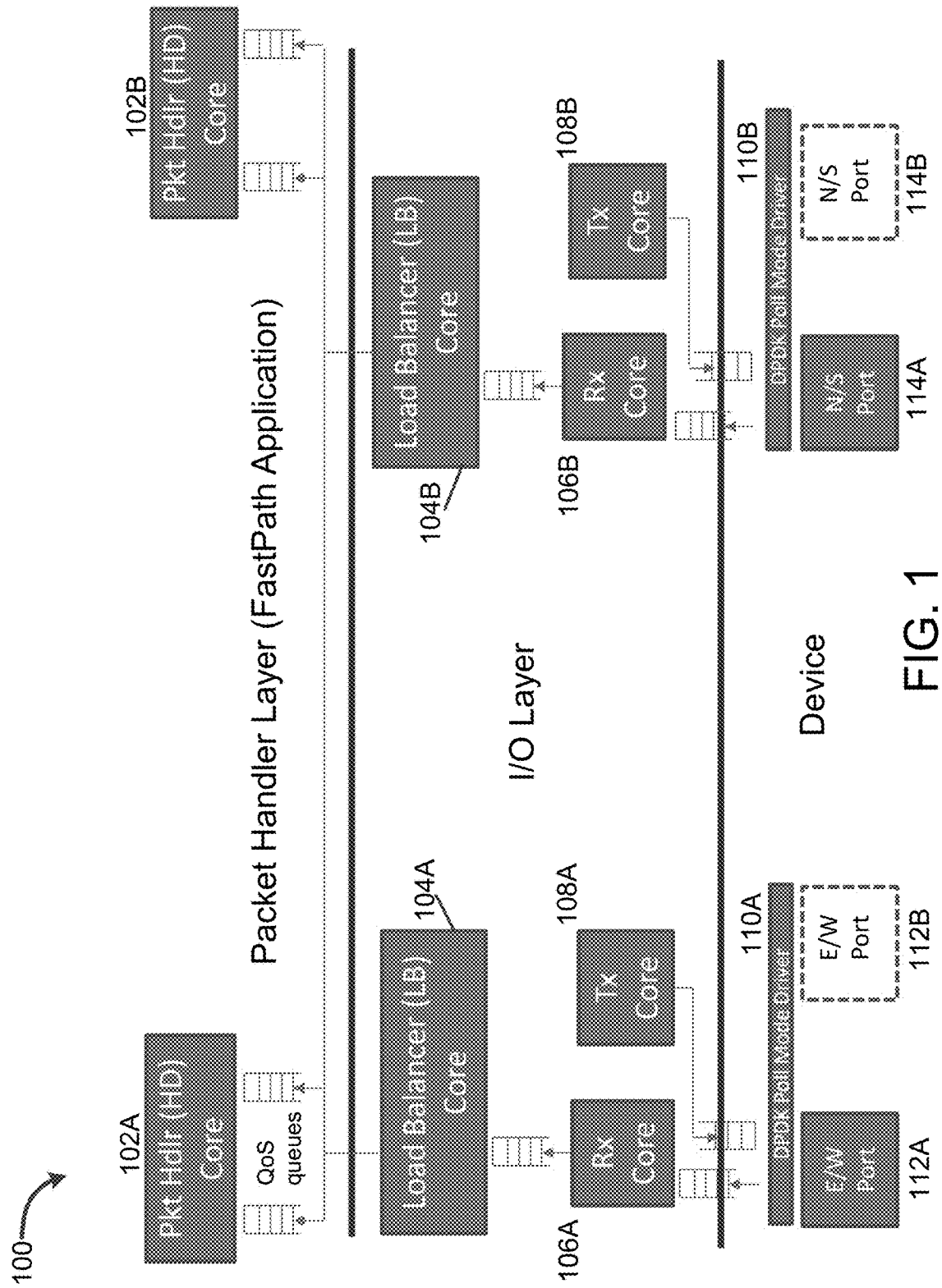
FIG. 1 is a diagram illustrating packet flow through a multi-core communications system, in accordance with some embodiments of the disclosed subject matter.

Some embodiments described herein relate to the confinement, or "pinning," of packet processing for a given wireless subscriber to a single "packet handler" core, thereby improving throughput in a telecommunication system and reducing the probability and incidence of cache misses. For example, packet header data can include a subscriber's tunnel endpoint identifier ("TEID") and/or a session identifier ("session ID" or "workflow session ID"), and a load balancer core can use one or both identifiers to select a packet handler core through which the packet's bidirectional traffic will be directed. In some such embodiments, a hashing algorithm is used to distribute multiple UEs to each of multiple packet handler cores, to balance the collective load across the multiple cores.

Other embodiments relate to differentiating between system-initiated proxy traffic and downstream UE (e.g., non-proxy) traffic using a partitioned multiprotocol label switching ("MPLS") label space. For example, the MPLS label space can be split into a UE Pool Address Domain and a Proxy Loopback Address Domain.

Use of TEID and Workflow Session ID to Identify and Route Upstream and Downstream Traffic Traditional methods of routing telecommunications traffic between an access network and a packet data network have based their selection of packet processing cores on packet source data and packet destination data. By contrast, in embodiments of the present disclosure, for a given wireless subscriber's user equipment ("UE"), packets received from the Access-side of the network and the corresponding response packets coming from the Internet core are identified and routed to a processing core based on a corresponding subscriber's tunnel endpoint identifier ("TEID") and a Workflow Session ID. The DPDK load balancer core uses a common value (e.g., the first 24 bits in each) of the TEID and Workflow Session ID to select/assign a specific core, thereby pining the packet processing of that UE to that core for as long as the UE subscriber session, corresponding to the Workflow Session ID, is active. In some implementations, the TEID is a subscriber-specific identifier that is negotiated between a mobility management entity ("MME") or Evolved Node B ("eNodeB") and an MCC of the present disclosure. For example, in some embodiments, an initial "create session" request is sent from the MME/eNodeB to the MCC. The MCC assigns a Workflow Session ID (e.g., 24 bits), a tunneling ID ("TEID") that includes the Workflow Session ID (e.g., 32 bits, including the 24-bit Workflow Session ID), and a UE IP address. In other words, the assignment of the Workflow Session ID can include replicating the first 24 bits of the TEID as the 24 bits of the Workflow Session ID (ensuring that the first 24 bits of each match). These assignments at the MCC can be performed by one or more systems described herein. The MCC sends the TEID and UE IP address back to the MME/eNodeB, and the MME/eNodeB sends a modified TEID back to the MCC. In some such embodiments, the modified TEID includes the same 24-bit Workflow Session ID as the TEID of the originally proposed TEID. It is this back-and-forth negotiation between the MME/eNodeB and the MCC that results in a finalized TED that will later be used for the identification and/or routing of data packets assigned to the specified user during the associated session. The finalized TEID is transferred, at the MCC, from the control plane to the WSM and one or more IOMs in the data plane for later use. The TEID can be added to a packet header at the input-output multiplexing ("IOM") stage. Once the negotiated TEID is established, subscriber data packets originating from one or more UEs and having TEID-bearing headers can be virtually GTP-U tunneled to the MCC. A hashing algorithm can then be used on the packet header to allocate or distribute multiple UEs across all available cores.

Figure 14:
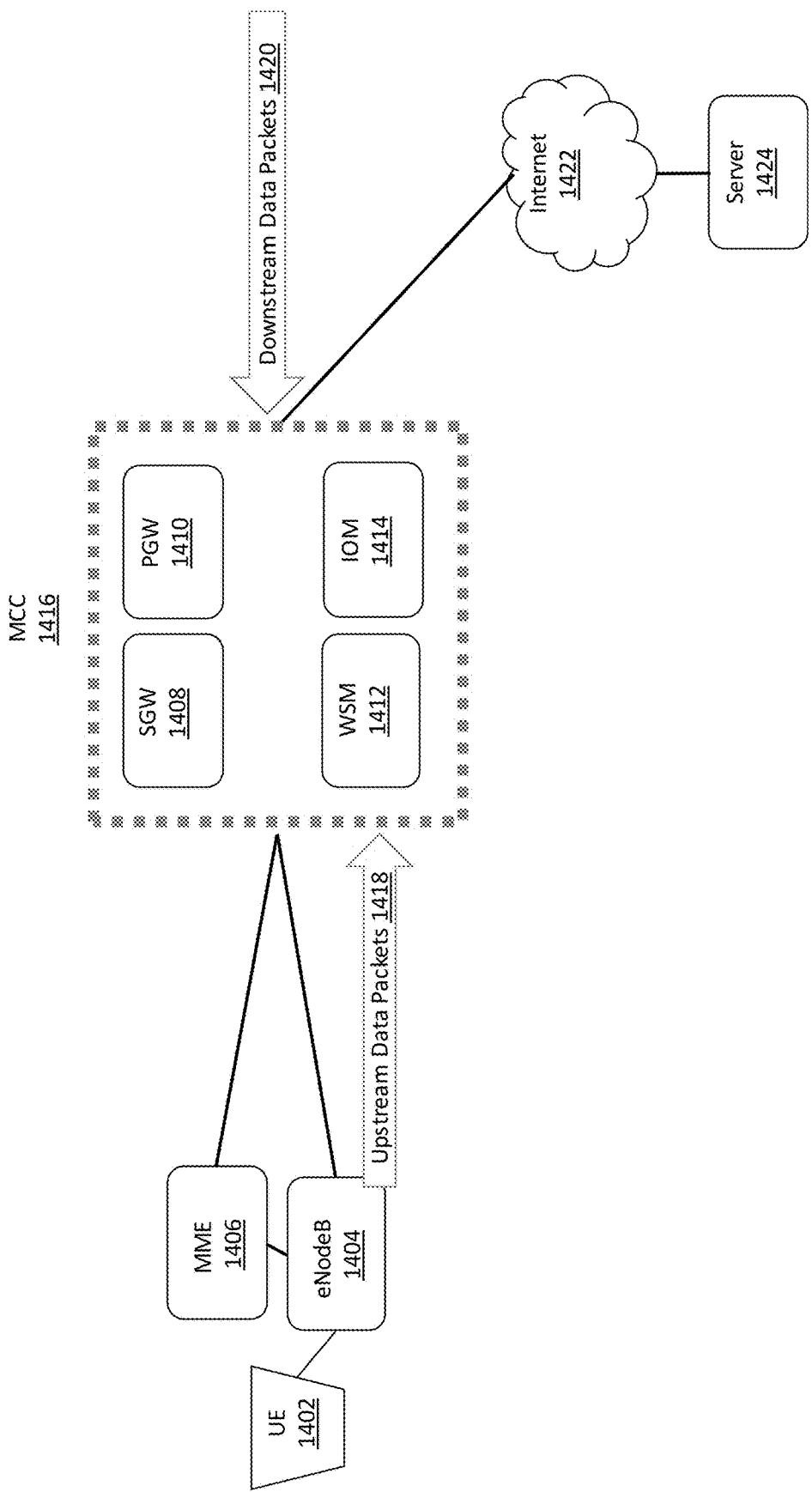
FIG. 14 a diagram illustrating an exemplary network architecture according to some embodiments of the disclosed subject matter.

FIG. 14 is a diagram illustrating an exemplary network architecture according to some embodiments. User Equipment ("UE") 1402 communicates with eNodeB 1404, which in turn communicates with Mobility Management Entity ("MME") 1406 and Mobile Content Cloud ("MCC") 1416. MCC 1416 includes several logical nodes including a Serving Gateway ("SGW") 1408, a Packet Data Network Gateway ("PGW") 1410, a series of Workflow Service Modules ("WSM"), and a series of Input/Output Multiplexors ("IOM") 1414. The MCC 1416 is further connected to a packet data network such as Internet 1422, through which it can access an external server 1424. MCC 1416 receives upstream data packets 1418 that are associated with UE 1402. MCC 1416 also receives downstream packets 1420 that are associated with UE 1402. In some embodiments, upstream packets refer generally to packets flowing away from a UE 1402 an downstream packet refer generally to packet flowing toward a UE 1402. As described in further detail below, MCC 1416 uses a TEID, UE IP Address, and Session ID to pin the routing and processing of both Upstream and Downstream packets associated with UE 1402 to a certain packet handler core within the MCC.

Figure 15:
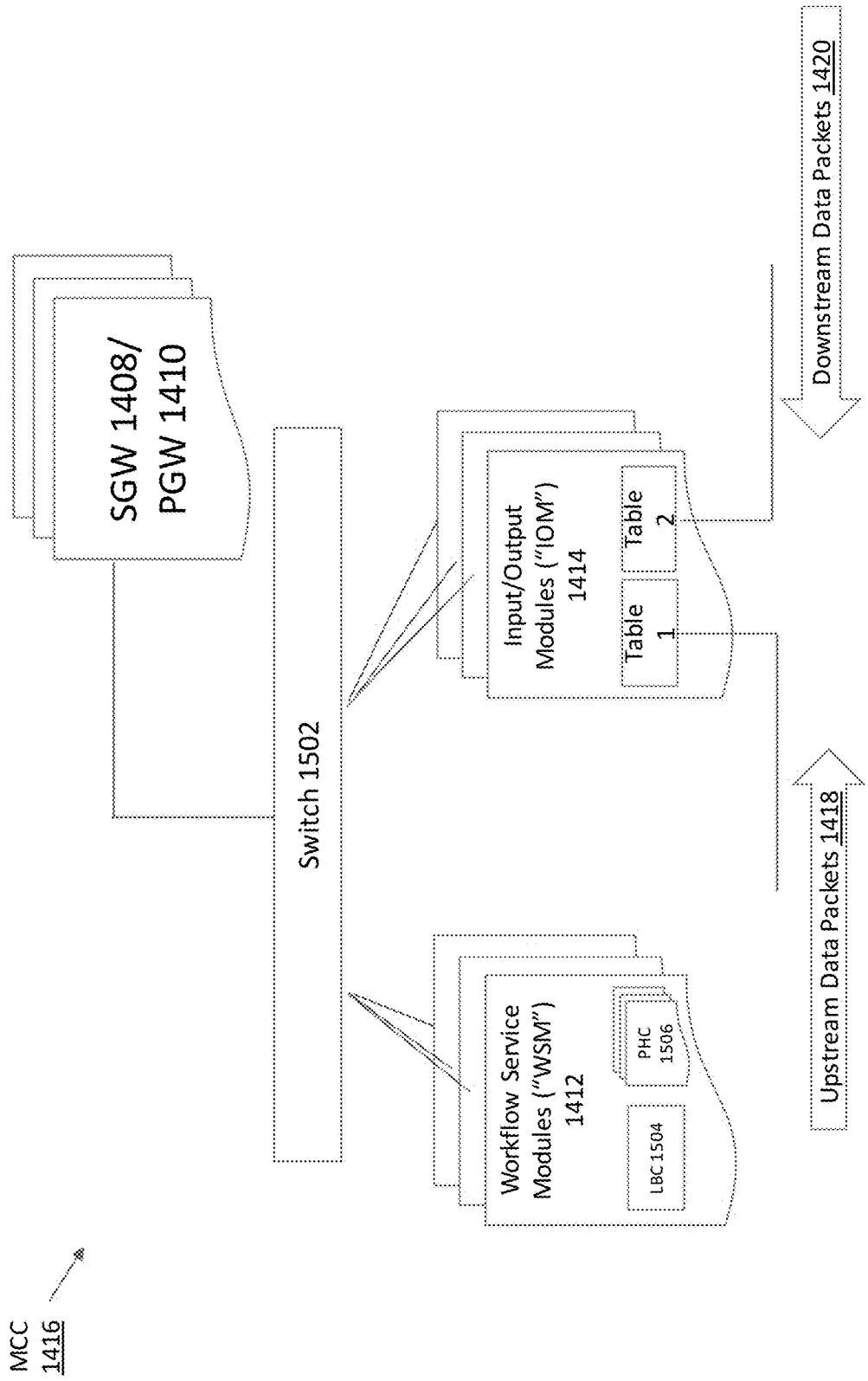
FIG. 15 is a diagram illustrating an exemplary configuration of an MCC, according to some embodiments of the disclosed subject matter.

FIG. 15 is a diagram illustrating an exemplary configuration of MCC 1416. MCC 1416 can be implemented on a processing machine having one or more physical or virtual processing cores. As illustrated, logical nodes are connected via Switch 1502. For example, logical nodes for the series of Workflow Service Modules ("WSM") 1412, the series of Input/Output Multiplexors ("IOM") 1414, and a series of SGW 1408/PGW 1410 modules are connected to Switch 1502. Each of the series of Workflow Service Modules ("WSM") 1412 includes a Load Balancing Core ("LBC") 1504 and a series of Packet Handler Cores ("PHC") 1506. The Input/Output Multiplexors are configured to receive Upstream Data Packets 1418 and Downstream Data Packets 1420. Each of the series Input/Output Multiplexors ("IOM") 1414 also includes one or more tables used to select and assign a particular WSM and PHC to an incoming Data Packet.

Figure 16:
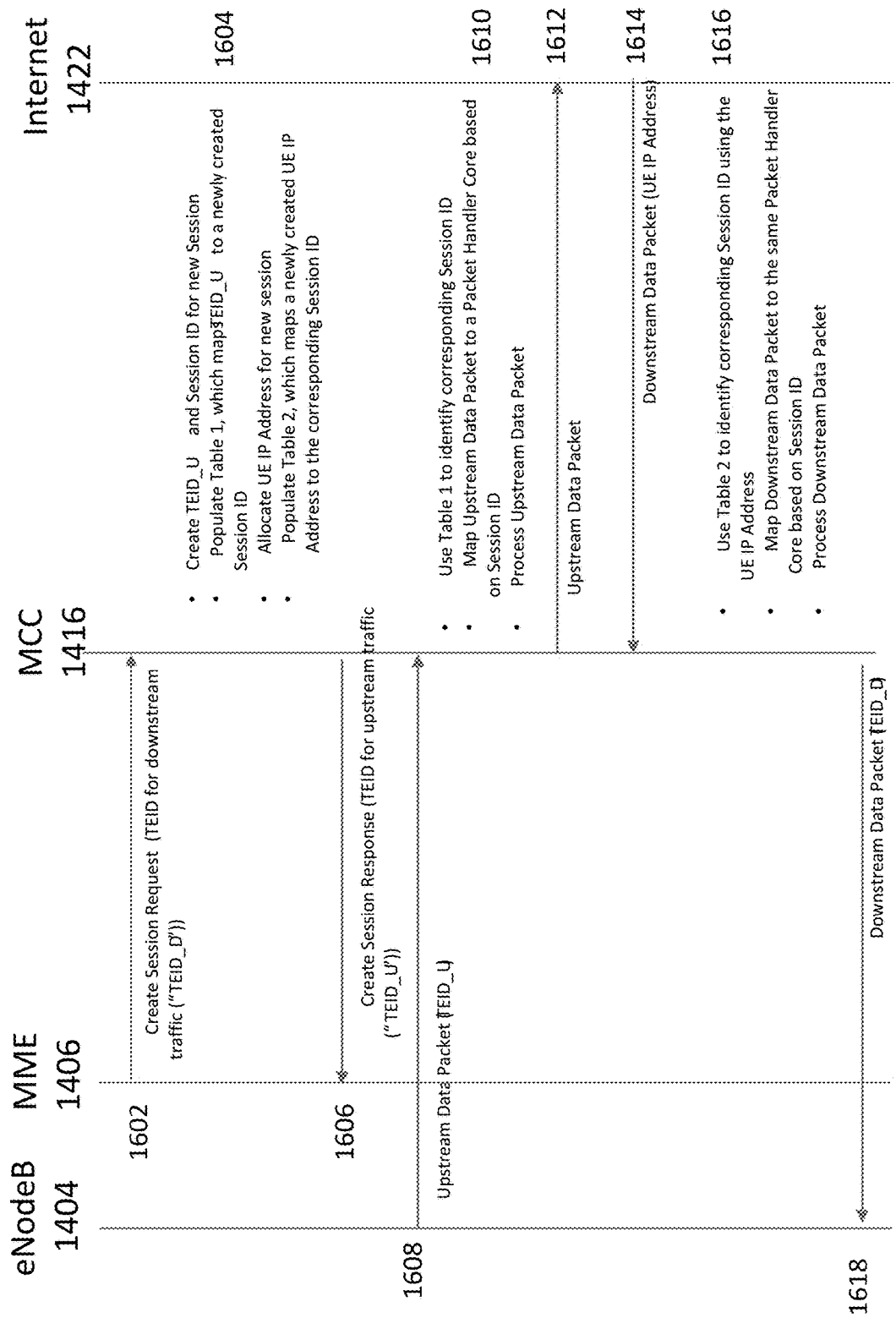
FIG. 16 is a flow diagram related to establishing a session according to some embodiments of the disclosed subject matter.

FIG. 16 illustrates a flow diagram according to some embodiments. In Step 1602, MCC 1416 receives from MME 1406 a request to create a session for a user device. The request includes a TED that MCC 1416 will later use for downstream traffic directed to the user device (designated "TEID_D"). In step 1604, MCC 1416 creates a TEID that is associated with a new session and that will be used by the eNodeB 1404/MME 1406 for upstream traffic associated with the user device (designated "TEID_U"). MCC 1416 also creates a Session ID that is associated with the new session. In some embodiments, the TEID_U and the Session ID share a common value. For example, the first 24 bits of the TEID_U may match the first 24 bits of the Session ID. Once the TEID_U and Session ID are created, MCC 1416 notifies all IOMs within MCC 1416 that the newly created TEID_U corresponds to the newly created Session ID. In some embodiments, individual IOMs may keep a record of this information in a table.

MCC 1416 also allocates a UE IP Address that is associated with the new session. This UE IP Address will be used as a source IP address for outgoing traffic to an external data network such as Internet 1422. It will also be used as the destination IP address for incoming traffic for the user device from the external data network. Upon creating the UE IP Address, MCC 1416 notifies all IOMs within MCC 1416 that the newly created UE IP Address is correlated with the newly created Session ID. In some embodiments, individual IOMs may keep a record of this correlation in a table. In Step 1606, MCC 1416 sends a Create Session Response to eNodeB 1404/MME 1406. The Create Session Response contains TEID_U.

In Step 1608, MCC receives an Upstream Data Packet from eNodeB 1404/MME 1406. The Upstream Data Packet includes the TEID_U previously established. In Step 1610, MCC 1416 identifies the session ID corresponding to TEID_U. In some embodiments, an IOM identifies the session ID by using the TEID_U as an index into a table. The IOM will then select a Workflow Service Module ("WSM") based on the Session ID for processing the Upstream Data Packet and route the Upstream Data Packet to the selected WSM. The WSM chooses a specific Packet Handler Core ("PHC") based on the Session ID. In some embodiments, a hashing algorithm is used to distribute the Upstream Data Packet to a PHC based on the Session ID. In Step 1612, the Upstream Data Packet is routed to its destination address in an external data network (e.g. Internet 1422).

In Step 1614, MCC 1416 receives a Downstream Data Packet including the UE IP Address. The UE IP Address indicates that the Downstream Data Packet is associated with the device user. In Step 1616, MCC 1416 identifies the Session ID corresponding to the UE IP Address. In some embodiments, an IOM identifies the Session ID by using the UE IP Address as an index into a table. The IOM will then select a Workflow Service Module ("WSM") based on the Session ID for processing the Downstream Data Packet and route the Downstream Data Packet to the selected WSM. The WSM chooses a specific Packet Handler Core ("PHC") based on the Session ID. In some embodiments, a hashing algorithm is used to distribute the Downstream Data Packet to a PHC based on the Session ID. Since the Session ID identified for this Downstream Data Packet matches the Session ID identified for Upstream Data Packets, the traffic associated with the device user will be confined or "pinned" to a particular Packet Handler Core. Alternatively, in some embodiments, the UE IP Address received in Step 1614 is mapped directly to a Packet Handler Core. For example, the IOM may keep a table correlating UE IP Address with the Packet Handler Core previously identified for the corresponding Session ID. The Packet Handler Core processes the Downstream Data Packet. In Step 1618, the Downstream Data Packet is routed to eNodeB 1404/MME 1406 using TEID_D.

Figure 17:
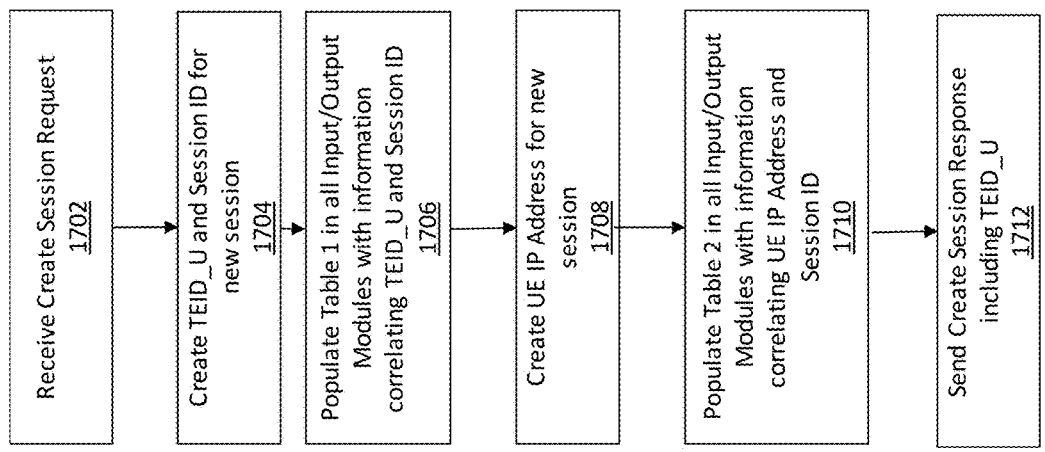
FIG. 17 is a flow chart illustrating a method for establishing a session according to some embodiments of the disclosed subject matter.

FIG. 17 is a flow chart illustrating a method for establishing a session according to some embodiments. In Step 1702, a request is received to create a session. In step 1704, a TEID_U and Session ID, both associated with a new session are created. In Step 1706, IOMs are notified of the correlated TEID_U and Session ID. In some embodiments, IOMs may keep a record of this correlation in a table. In Step 1708, a UE IP Address corresponding to the new session is created. In Step 1710, IOMs are notified of the UE IP Address and its correlation with the new session and the Session ID. In some embodiments, individual IOMs may keep a record of this correlation in a table. In some embodiments, the UE IP Address is directly mapped to a Packet Handler Core. In Step 1712, a Create Session Response is sent, including the TEID_U.

Figure 18:
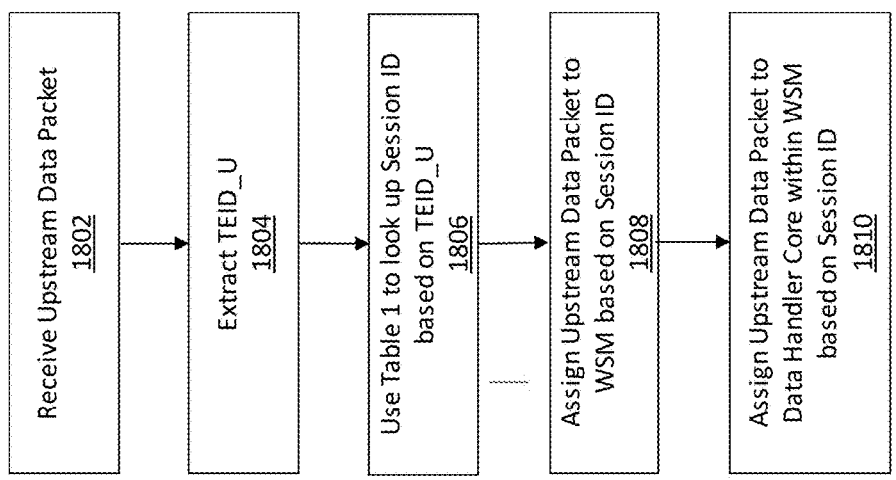
FIG. 18 is a flow chart illustrating a method for processing upstream data packets according to some embodiments of the disclosed subject matter.

FIG. 18 is a flow chart illustrating a method for processing Upstream Data Packets according to some embodiments. In Step 1802, an Upstream Data Packet is received. The Upstream Data Packet includes a TEID_U corresponding to a session ID. In Step 1804, the TEID_U is extracted from the Upstream Data Packet. In Step 1806, the Session ID corresponding to the TEID_U is identified based on a lookup table. In Step 1808, the Upstream Data Packet is assigned to a WSM based on the identified Session ID. In Step 1810, the Upstream Data Packet is further assigned to a Packet Handler Core based on the Session ID. In some embodiments, the Upstream Data Packet is assigned to a particular Packet Handler Core based on a hashed value of the Session ID.

Figure 19:
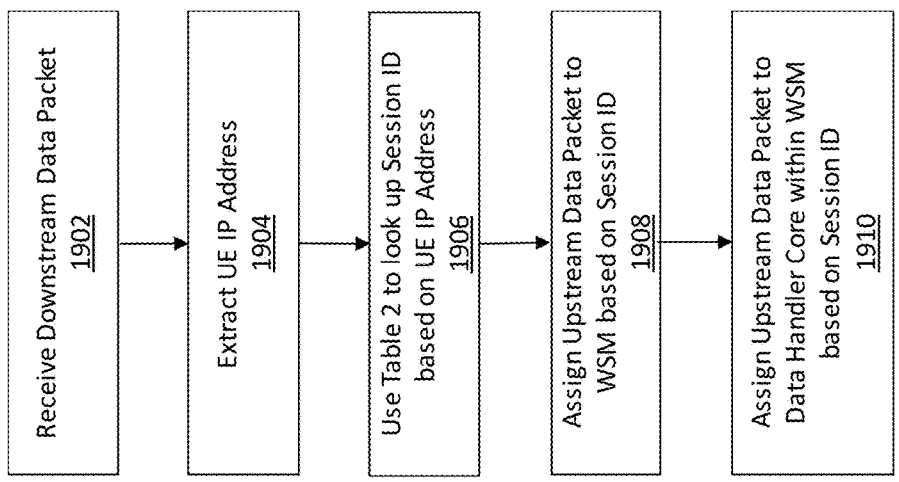
FIG. 19 is a flow chart illustrating a method for processing downstream data packets according to some embodiments of the disclosed subject matter.

FIG. 19 is a flow chart illustrating a method for processing Downstream Data Packets according to some embodiments. In Step 1902, a Downstream Data Packet is received. The Downstream Data Packet includes a UE IP Address corresponding to a Session ID. In Step 1904, the UE IP Address is extracted from the Downstream Data Packet. In Step 1906, the Session ID corresponding to the UE IP Address is identified based on a lookup table. In Step 1908, the Downstream Data Packet is assigned to a WSM based on the identified Session ID. In Step 1910, the Upstream Data Packet is further assigned to a Packet Handler Core based on the Session ID. In some embodiments, the Downstream Data Packet is assigned to a particular Packet Handler Core based on a hashed value of the Session ID.

Splitting of MPLS Label Space to Distinguish UE Traffic from System-Initiated Proxy Traffic on the Interface Facing the Internet Core In some embodiments, when multiprotocol label switching ("MPLS") is used on the core side, in order to distinguish system-initiated proxy traffic from downstream UE traffic, the MPLS label space can be split into two different domains: a UE Pool Address Domain and a Proxy Loopback Address Domain. Static Routes corresponding to a given UE's IP address can be advertised using labels from the UE domain, and static routes corresponding to Proxy Loopback addresses can be advertised using labels from the Loopback Address Domain by multi-protocol border gateway protocol ("MP-BGP"). The DPDK load balancer core can then use the label range information to distinguish proxy traffic from downstream UE traffic. For example, UE packets can be load balanced based on the Session ID when downstream Proxy Traffic packets are load balanced based on 5-Tuple values (e.g., one or more of: source address, destination address, source port, destination port and ether type).

Embedding Core ID Information in the IPv4 Source Network Address Translation ("NAT") Address for Pinning Downstream Proxy Traffic When the system identifies proxy service for a subscriber/UE, all packets from that sub scriber/UE are steered to the Value Added Service ("VAS") module for proxy service. The Workflow Service module uses IPv4 based Source NAT to communicate with the VAS module. The third byte of the NAT address is encoded to carry the core ID information. On the return path, a load balancer core on the Workflow Service module extracts the core information from the NAT address and steers the packet to the corresponding core for downstream processing. This ensures upstream and downstream UE proxy traffic are processed on the same core maximizing L2 cache utilization and increasing performance of the system.

Prior solutions were based on UE address as the hash value to pick up the packet core. But this solution did not work across various service platforms. Furthermore, there was no solution to the proxy traffic load balancing on Workflow Service Module as well as identifying proxy vs no-proxy downstream traffic based on MPLS label.

Pinning UE traffic based on TEID and Session ID is a catch-all solution across all service platforms for increasing data throughput. Use of an MPLS label to identify downstream UE traffic and embedding core information in the NAT address further helps bind UE to specific core, thereby enhancing better user experience.

Turning now to the drawings, FIG. 1 is a diagram illustrating packet flow through a multi-core communications network, in accordance with some embodiments of the disclosed subject matter. For example, a WSM module, IOM module, or combined WSM/IOM module maybe implemented as illustrated. As shown in FIG. 1, a multi-core system 100 includes a device layer, an input/output ("I/O") layer, and a packet handler layer (also referred to herein as the "fast path" layer). In general, as used herein, packets originating from a server and passing to another server within the data center are said to travel in an east-west ("E/W") direction, and pass through an E/W port (112A, 112B). Whereas, packets passing between a network subscriber's user equipment (UE), such as a mobile device or computer, and a packet data network destination (e.g., the internet), are said to travel in a north-south ("N/S") direction, and pass through a N/S port (114A, 114B). In the multi-core system 100, E/W port 112B and N/S port 114B are optional. Regardless of whether the packet traffic is E/W or N/S, the corresponding packets are passed to the I/O layer via a Data Plane Development Kit ("DPDK") poll mode driver (110A, 11B) and are received in the I/O layer by a receive (Rx) core (106A, 106B). The Rx core(s) pass the packet(s) to an associated load balancer ("LB") core (104A, 104B) operably coupled thereto. The LB core(s) then pass the packets, which may have been modified by the respective LB core(s), to one of a plurality of packet handler ("HD") cores (102A, 102B) via a quality of service ("QoS") queue. Due to the availability of, and routing through, multiple packet handler cores (e.g., in the fast path layer), packet data subsets can become corrupted due to non-coordinated edits being made to the same data subset, and a mechanism for "locking" the data structures may be needed to mitigate the data corruption risk. Cache misses, in which data requested for processing is not found in the cache memory, can also occur when packets are routed through multiple cores, resulting in processing delays. Using techniques described herein, cache misses and the need for locking mechanisms are reduced or precluded by the "pinning" of packet traffic for a given subscriber/UE to a single packet handler core within the multi-core system, such that all corresponding northbound and southbound traffic is passed through the same packet handler core. Methods described herein can also be implemented for proxy applications. For example, a packet coming from a UE via the N/S port 114 may pass through Rx core 106B, and then to the LB core 104B. The LB core 104B can assign one of the packet handler cores (102B) to the packet. Also, upon determining that the packet is a proxy packet, the LB core 104B can perform an internal network address translation ("NAT") translation of the packet to embed an IP address and source port instructing the packet to be routed to an internal proxy for processing. While processing the packet, packet handler core 102B can determine (e.g., based on the modifications made to the packet by the LB core 104B) that the packet is a proxy packet and forward the packet to another server that is co-located with, or remote from, the packet handler core 102B, for processing. To define the return path, the server extracts the IP address and destination port number from the packet to ensure that the packet is routed back to N/S port 114A via packet handler core 102B.

Figure 2:
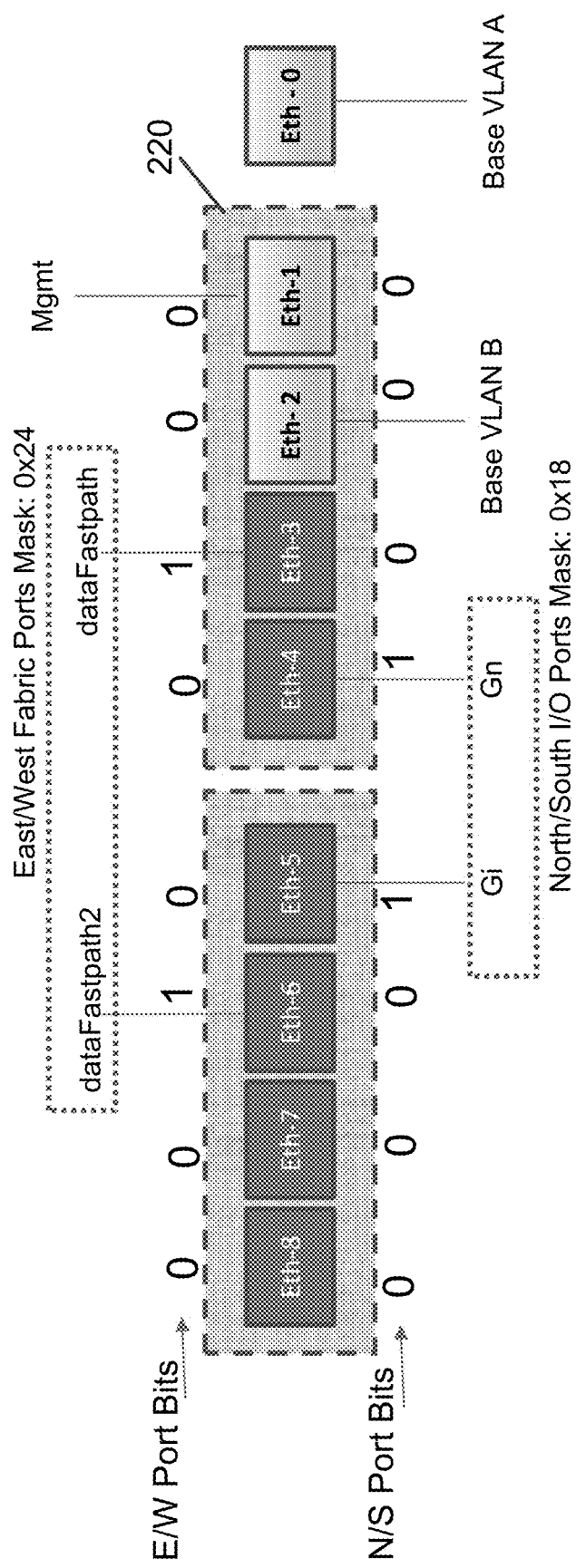
FIG. 2 illustrates a Data Plane Development Kit ("DPDK") port bit mask using single root input/output virtualization ("SR-IOV"), in accordance with some embodiments of the disclosed subject matter.

FIG. 2 illustrates a DPDK port 220-bit mask using single root input/output virtualization ("SR-IOV"), in accordance with some embodiments of the disclosed subject matter. In some implementations, the system stores a mapping of which ports are N/S ports and which ports are E/W ports, for internal use. This mapping can be used to define each Ethernet port as a "$G_i$" (e.g., internet-facing) port or a "$G_n$" (e.g., traffic from a subscriber) port. An example snippet, written in XML code, of this port mapping is as follows:

```
/etc/platform/platform.xml
platform.xml -> /etc/platform/platform_SRIOV_RED.xml
<!-- Variables for DPDK -->
  <dpdk>
    <sriov>true</sriov>
    <loadbalDpdkPorts>3c</loadbalDpdkPorts>
    <loadbalThreadsCount>1</loadbalThreadsCount>
    <loadbalHugePageSize>25</loadbalHugePageSize>
    <loadbalHugePageCount>1500</loadbalHugePageCount>
    <loadbalCoreCount>ffffff0</loadbalCoreCount>
    <loadbalIoCorePortMask0>24</loadbalIoCorePortMask0>
    <loadbalIoCorePortMask1>18</loadbalIoCorePortMask1>
    <loadbalIoFctGrouping>all-separated</loadbalIoFctGrouping>
    <workflowDpdkPorts>24</workflowDpdkPorts>
    <workflowThreadsCount>1</workflowThreadsCount>
    <workflowHugePageSize>25</workflowHugePageSize
    <workflowHugePageCount>1500</workflowHugePageCount>
    <workflowCoreCount>ffffff0</workflowCoreCount>
    <workflowIoCorePortMask0>24</workflowIoCorePortMask0>
    <workflowIoFctGrouping>all-separated</workflowIoFctGrouping>
```

Figure 3:
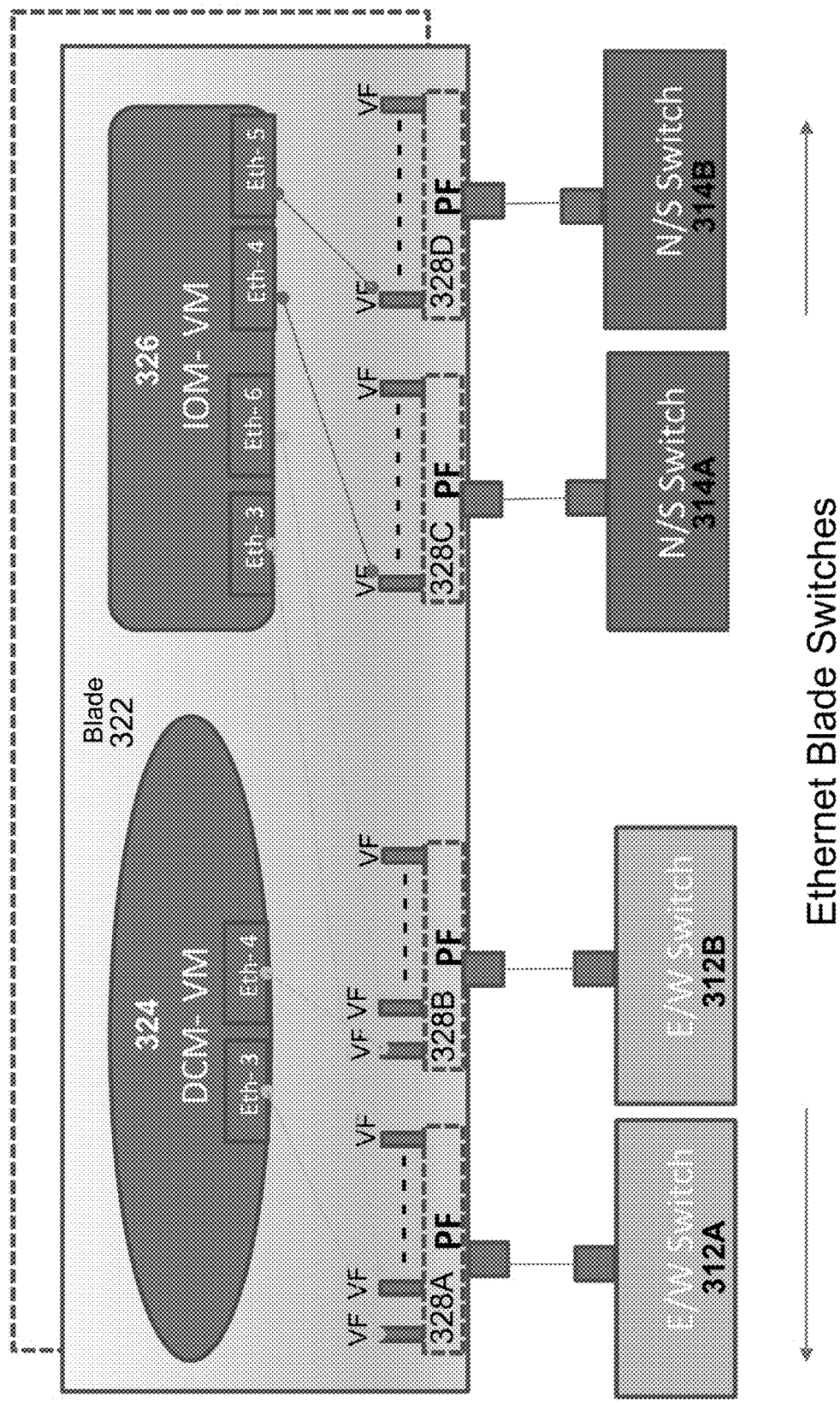
FIG. 3 is a diagram illustrating SR-IOV data port connectivity, in accordance with some implementations of the disclosed subject matter.

FIG. 3 is a diagram illustrating SR-IOV data port connectivity, in accordance with some implementations of the disclosed subject matter. As shown in FIG. 3, redundant E/W switches (312A, 312B) and redundant N/S switches (314A, 314B) are each operably coupled to a plurality of servers 322 (e.g., C7000 blade servers). In some implementations, each server 322 is connected to a single N/S switch. Each switch can have a single physical function ("PF": 328A-328D) with multiple associated virtual functions ("VFs"), and these VFs can be mapped to each PF upon instantiation of the relevant VM(s). Each server 322 can include multiple virtual machines ("VMs"), such as: (1) a digital control module "DCM" VM 324, e.g., connected only to E/W switches because it is an internal virtual machine; and (2) an input/output multiplexer "IOM" VM 326. Each VM can include a plurality of logical interfaces ("Eth-3," "Eth-4," etc.), as shown in FIG. 3, and these logical interfaces can be assigned as $G_i$ or $G_n$ interfaces, for example when the relevant VM is instantiated. In some embodiments, each VF corresponds to only one such logical interface.

Figure 4:
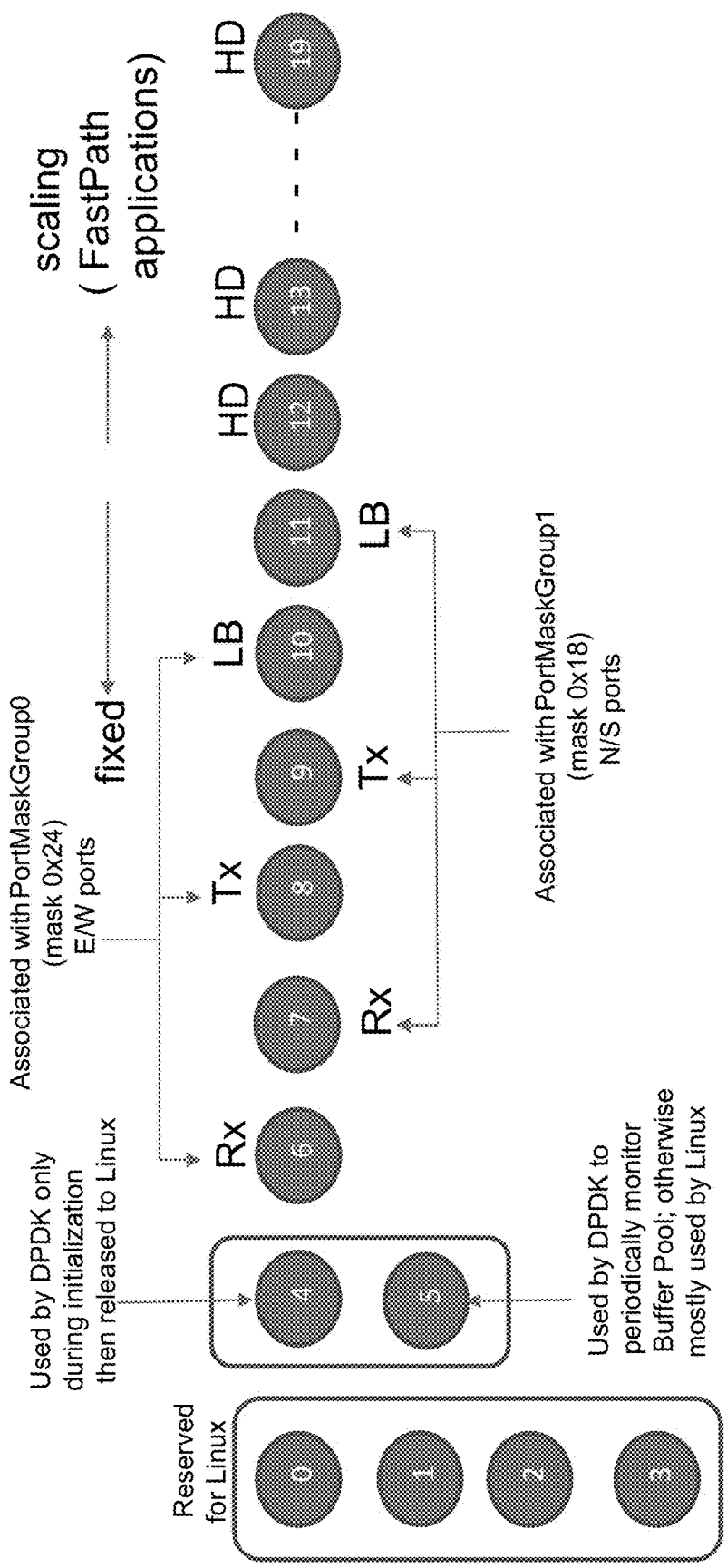
FIG. 4 is a diagram illustrating SR-IOV core mapping, in accordance with some implementations of the disclosed subject matter.

FIG. 4 is a diagram illustrating SR-IOV core mapping, in accordance with some implementations of the disclosed subject matter. As presented in FIG. 4, cores 0-3 are reserved for Linux operations running on the VM. Core 4 is used by the DPDK (an Intel-supplied library) during initialization and then released to Linux. Core 5 is used by the DPDK to periodically monitor the buffer pool, and is otherwise used by Linux. Cores 6, 8 and 10 correspond to Rx, Tx and LB, respectively, for the E/W fabric ports corresponding to port mask group 0, as shown and described previously with reference to FIG. 2. Cores 7, 9 and 11 correspond to Rx, Tx and LB, respectively, for the N/S fabric ports corresponding to port mask group 1, as shown and described previously with reference to FIG. 2. Cores 12-19 (7 cores in all) are used for packet processing. Cores 10 and 11 contain the load balancing algorithms, and the load balancing is implemented across cores 12-19.

In some existing configurations, the default load balancing algorithm is based on source and destination addresses, and is performed in two stages. In the first stage, the LB core determines, based on the ether-type, the protocol for the inner IP packet. MPLS packets can be identified during this stage, and the load balancing algorithm can be set to a 5-tuple for the inner IP packet. Fabric packets and other packet (or "payload") types can be identified by looking at the ether-type. Ether type can be used for purposes of routing of packets between an IOM and a WSM, as well as to determine the directionality of the packet (e.g., internet-bound or access-side bound) and/or to indicate which protocol is encapsulated in the payload of the Ethernet frame. For example, an IOM can extract a packet received from a UE, determine a MAC address for a destination WSM, and add an Ethernet header to the packet to ensure that the packet is properly switched/routed to the destination WSM.

Figure 5:
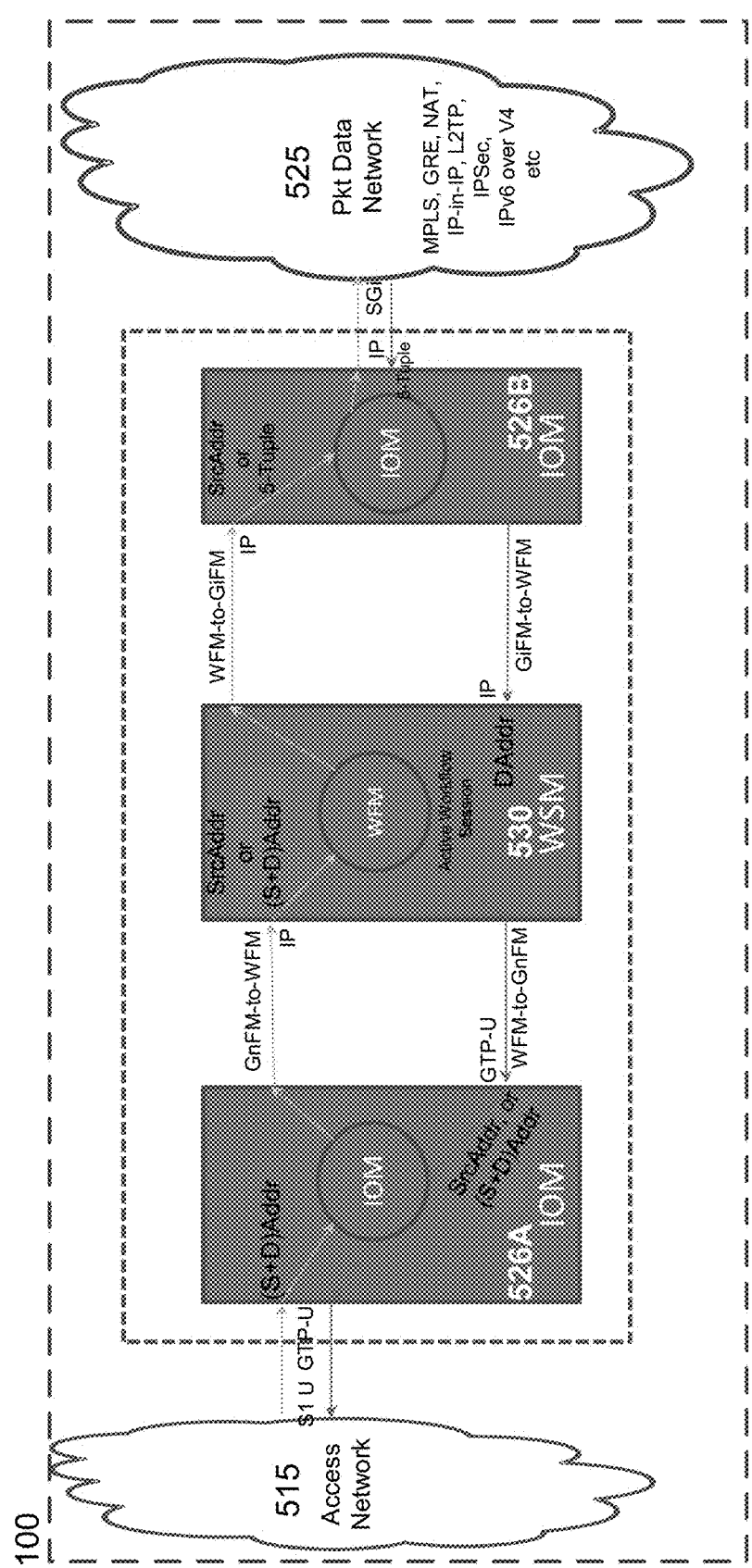
FIG. 5 is a diagram illustrating an existing load balancing method.

Referring now to FIG. 5, on a workflow service module ("WSM") 530, for an ether-type of General Packet Radio Service (GPRS) Tunneling Protocol ("GTP") network flow module to workflow module (GNFM-to-WFM) (i.e., UE-to-internet packet travel—see arrow pointing from IOM 526A to WSM 530), the routing dictated by the load balancing algorithm can based on a source address ("SrcAddr") or on a combination of the source and destination addresses ("(Src+Dst)Addr" or "(S+D)Addr"). On an IOM 526B, for an ether-type of WFM-to-GiFM (see arrow pointing from WSM 530 to IOM 526B), the routing dictated by the load balancing algorithm can based on a source address ("SrcAddr") or on a 5-tuple. In the second stage, the LB core, having determined the protocol for the inner IP packet during the first stage, identifies generic routing encapsulation ("GRE"), encapsulating security payload ("ESP"), layer 2 tunneling protocol ("L2TP") and/or General Packet Radio Service (GPRS) Tunneling Protocol ("GTP") packets. In some implementations, L2TP packets are load balanced based on a destination address ("DstAddr" or "DAddr"), since it is assumed that the packet is a downstream UE packet. Such load balancing can also be applied to the IP packet shown on the GiFM-to-WFM arrow in FIG. 5. For a GTP-U packet (i.e., a GTP packet carrying user data—see arrow pointing from WSM 530 to IOM 526A), the routing dictated by the load balancing algorithm can based on SrcAddr or (Src+Dst)Addr. If the protocol is ESP, the routing dictated by the load balancing algorithm can be based on round-robin or (Src+Dst)Addr. However, using the approach described in this paragraph, there is no mechanism at the $G_i$ interface to distinguish incoming proxy packets from downstream UE packets. Load-balancing is performed using a 5-tuple in both cases. The method may not work if IP fragments are received. Moreover, for standalone SGW/PGW applications, there is no distinction on the S5/S8 interface as to whether a packet is intended for SGW or PGW. GTP-U packets are load balanced using (Src+Dst) Addr. On WSM/SSM, downstream UE proxy packets are load balanced using a 5-tuple. Due to NAT translation, the UE address is not available at the DPDK level.

As discussed above, in existing communications architectures, packets arriving at a WSM from an access network are identified and routed to one or more packet processing cores based on a source and destination address, and packets arriving at a WSM from a packet data network are identified and/or routed by a destination address. Such designs lack flexibility, in that they are not compatible with all networking architectures. By contrast, in methods described herein (e.g., in the exemplary embodiments that follow), packets arriving at the WSM from the access network are identified and routed to one or more packet processing cores based on a TEID, and packets arriving at the WSM from the packet data network are identified and routed to one or more packet processing cores based on a Session ID. The TEID and the Session ID each contain the same first 24 bits. As a result, the load balancing capability (from a packet point of view) of methods and systems described herein can be implemented in a manner that is independent of the network configuration.

As used herein, a "GnFM-to-WFM" ether type, which stands for "General Packet Radio Service (GPRS) Tunneling Protocol ("GTP") network flow module to workflow module" ether type, refers to any ether type that encapsulates user data to facilitate communication between a network flow module (e.g., an access/user side of the network) and a workflow module. Likewise, a "WFM-to-GnFM" ether type refers to any ether type that encapsulates user data to facilitate communication between a workflow module and a network flow module.

As used herein, a "WFM-to-GiFM" ether type refers to any ether type that encapsulates user data to facilitate communication between a workflow module and an internet-facing module (e.g., an IOM in communication with a packet data network). Likewise, a "GiFM-to-WFM" ether type refers to any ether type that encapsulates user data to facilitate communication between an internet-facing module and a workflow module.

As used herein, a "SECM-to-SECM" ether type refers to any ether type that facilitates communication between networked security modules within a communications network.

As used herein, a "SECM-to-IOM" ether type refers to any ether type that facilitates communication between a security module and an input-output multiplexer module within a communications network.

Figure 6:
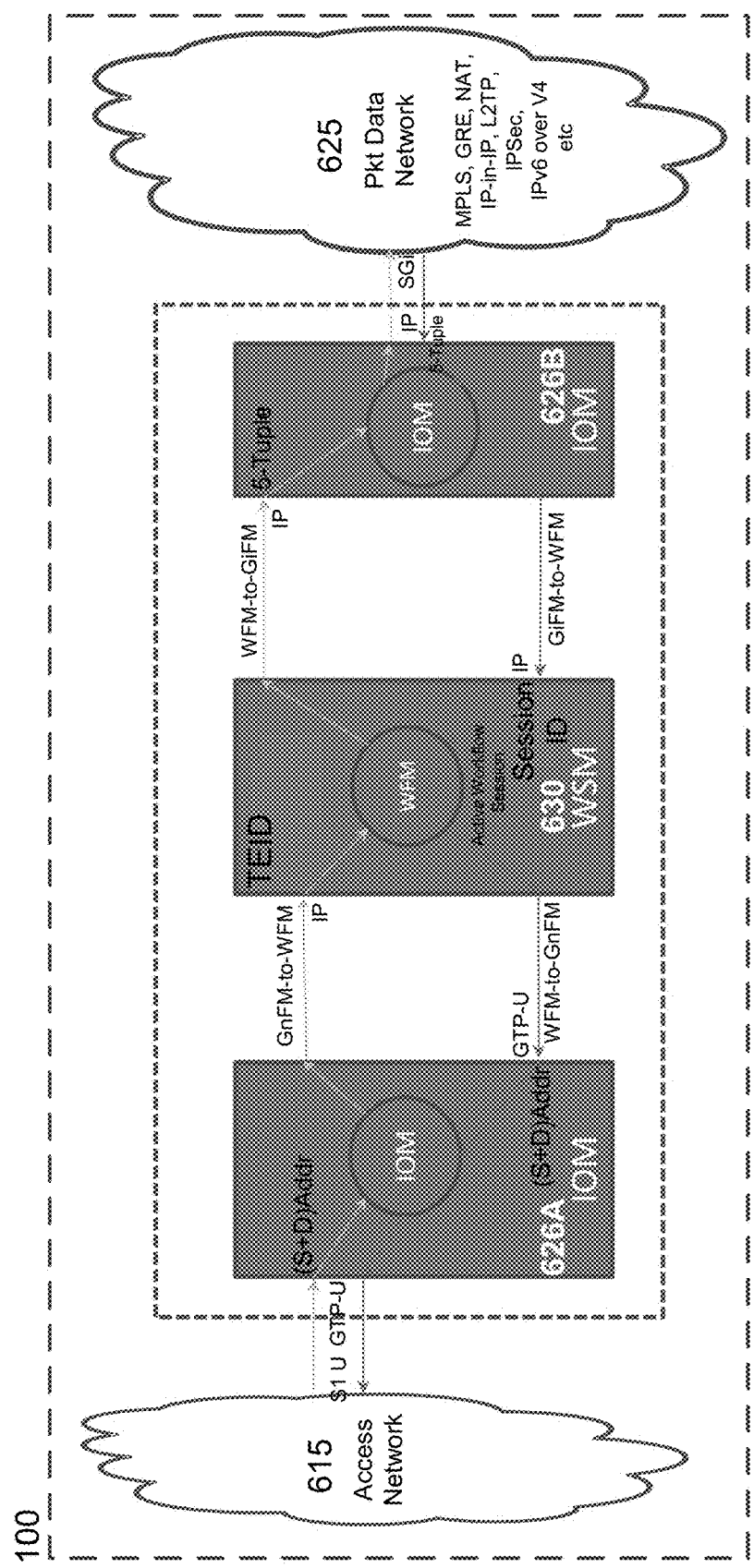
FIG. 6 is a diagram illustrating load balance hashing for non-proxy applications using a mobile content cloud ("MCC"), in accordance with some embodiments of the disclosed subject matter.

FIG. 6 is a diagram illustrating load balance hashing for non-proxy (e.g., direct packet traffic between a UE and the internet) applications taking place within the mobile content cloud ("MCC") 100, in accordance with some embodiments of the disclosed subject matter. As shown in FIG. 6, a data packet originating from a UE and arriving at an "S1 U" interface/port of an access network 615 is GTP-U tunneled to an IOM 626A. The packet at IOM 626A is identified via hashing of source and destination addresses ("(Src+Dst) Addr"), and contains a negotiated TEID (the GTP-U header tunnel ID). In some implementations, all IOMs receive data associating a UE with a Session ID based on a return destination IP address. The TEID is added to the packet header at this IOM stage (e.g., added by eNodeB in the control plane and then sent to the IOM in the data plane). The packet is forwarded by the IOM 626A to a WFM on a WSM 630 (i.e., to the WSM 630A's IP address), using a GnFM-to-WFM ether type (which, as noted above, stands for General Packet Radio Service (GPRS) Tunneling Protocol ("GTP") network flow module to workflow module). The packet is received by the load balancer core on the WSM, and the WSM 630 determines which packet handler core to assign to the packet. Inside the GnFM-to-WFM packet is the UE packet, from which the GTP header can be extracted. The GTP header carries the TEID (the first 24 bits of which are the same as the first 24 bits of the Session ID). The packet is identified, at the WSM 630, by its 24-bit TED, and the TEID is hashed to identify the appropriate packet handler core to which the packet will be routed. The packet is forwarded by the WSM 630 to IOM 626B (i.e., to the IOM 626B's IP address), using a WFM-to-GiFM ether type, where it is identified using a 5-tuple (e.g., source address, destination address, source port, destination port and ether type) and can be sent to a packet data network 625 for further processing (e.g., including network access identification) before being returned to the IOM 626B, where it is again identified using a 5-tuple. The IOM 526B determines, using a lookup table, the appropriate Session ID to add to the packet header. In some implementations, a lookup table is maintained on the IOM, and includes data for every subscriber serviced. This lookup table can be populated, for example, upon the creation of a session for a subscriber. As described herein, a session carries both a TEID and a Session ID. When a packet enters the MCC from the Internet side, its destination address is the Subscriber IP address (this is a downstream packet going towards the subscriber). This IP address can be used to cross-reference against the lookup table to identify the Session ID of the associated subscriber. When a packet enters from the access side, its source address is the subscriber address and its destination address is the address of the server in the internet that the user is trying to access. This source address can be used to cross-reference against the lookup table and identify the associated TEID. Because of the nature of 4G networks, in some embodiments the session ID cannot always be obtained at the access side, however the TEID may be accessible. Similarly, on the PDN side, the session ID may be accessible. As such, in some implementations, the TEID is used on the access side and the Session ID is used on the PDN side for packet identification and/or routing. Since the upper 24 bits of both the TEID and the Session ID are designed to be same, those bits hash to the same core, thereby pinning the subscriber to a specific core.

The IOM 526B adds the appropriate Session ID to the packet header. Then, continuing along its return path, the packet is forwarded by the IOM 626B to the WFM on WSM 630 using a GiFM-to-WFM ether type, and the packet is identified and routed to a processing core at the WSM 630 based on its 24-bit Session ID. The WSM 630 hashes the Session ID to identify the corresponding TEID. The packet is then GTP-U tunneled from the WSM 630 back to the IOM 626A using WFM-to-GnFM before being returned to the access network 615 and the packet-originating UE. In some embodiments, IOM 626A and IOM 626B reside within the same physical location. In some embodiments, IOM 626A and IOM 626B represent a single IOM.

Figure 7:
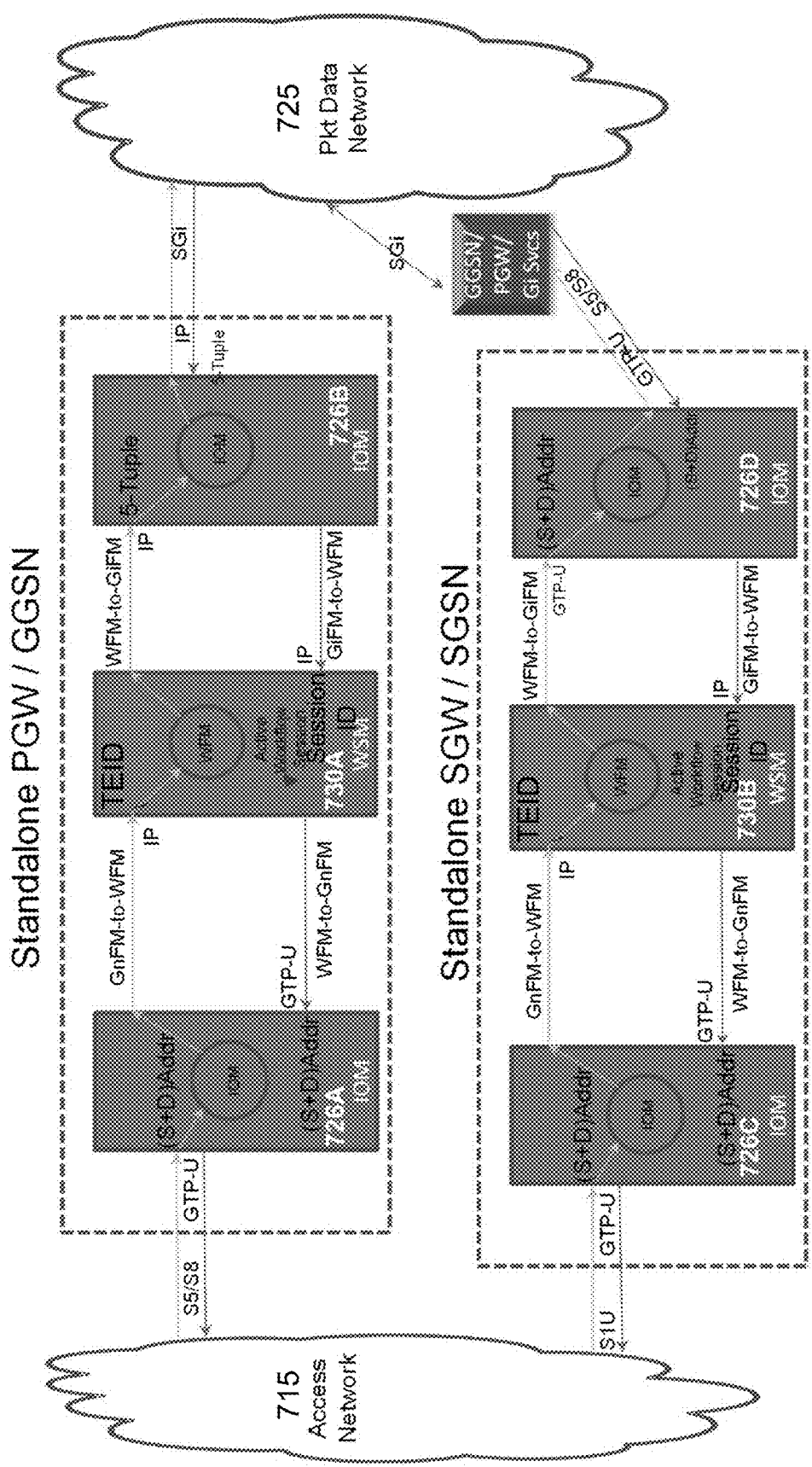
FIG. 7 is a diagram illustrating load balance hashing for non-proxy MCC applications with a standalone packet data network gateway ("PGW") and a standalone serving gateway ("SGW"), in accordance with some embodiments of the disclosed subject matter.

FIG. 7 is a diagram illustrating load balance hashing for non-proxy MCC applications with a standalone packet data network gateway ("PGW") (which can also act as a gateway GPRS support node, "GGSN") and a standalone serving gateway ("SGW") (which can also act as a serving GPRS support node, "SGSN"), in accordance with some embodiments of the disclosed subject matter. As shown in FIG. 7, following the standalone PGW/GGSN path, a data packet originating from a UE passes via an "S5/S8" interface/port of an access network 715 and is GTP-U tunneled to an IOM 726A, identified using its (Src+Dst)Addr, and can contain a negotiated TEID (the GTP-U header tunnel ID). The packet is forwarded by the IOM 726A to a WFM on a WSM 730A (i.e., to the WSM 730A's IP address), using a GnFM-to-WFM ether type, and is identified and routed to a processing core based on its TED. The packet is forwarded by the WSM 730A to IOM 726B, (i.e., to the IOM 726B's IP address), using a WFM-to-GiFM ether type, where it is identified and routed using a 5-tuple (e.g., source address, destination address, source port, destination port and ether type), and may be sent to a packet data network 725 for further processing before being returned to the IOM 726B, where it is again identified using a 5-tuple. Continuing along its return path, the packet is forwarded by the IOM 726B to the WFM on WSM 730A using a GiFM-to-WFM ether type, and is identified and routed to a processing core based on its Session ID. The packet is then GTP-U tunneled from the WSM 730A back to the IOM 726A using WFM-to-GnFM before being returned to the access network 715 and the packet-originating UE.

Following the standalone SGW/SGSN path in FIG. 7, a data packet originating from a UE passes via an "S 1U" interface/port of the access network 715 and is GTP-U tunneled to an IOM 726C, identified using its (Src+Dst)Addr, and can contain a negotiated TED (the GTP-U header tunnel ID). The packet is forwarded by the IOM 726C to a WFM on a WSM 730B (i.e., to the WSM 730B's IP address), using a GnFM-to-WFM ether type, and is identified and routed to a processing core based on its TEID. The packet is GTP-U tunneled by the WSM 730B to IOM 726D using a WFM-to-GiFM ether type, where it is identified using its (Src+Dst)Addr, and may be sent to the packet data network 725 for further processing before being returned to the IOM 726D, where it is again identified using its (Src+Dst)Addr. This transfer from the IOM 726D to the packet data network 725 can be GTP-U tunneling to an S5/S8 interface, and GGSN, PGW (a "4G" standard) and/or G1 services can be applied. On its return path through the standalone SGW, the packet is forwarded by the IOM 726D to the WFM on WSM 730B using a GiFM-to-WFM ether type, and is identified and routed to a processing core based on its Session ID. The packet is then GTP-U tunneled from the WSM 730B back to the IOM 726C using WFM-to-GnFM before being returned to the access network 715 and the packet-originating UE.

Figure 8:
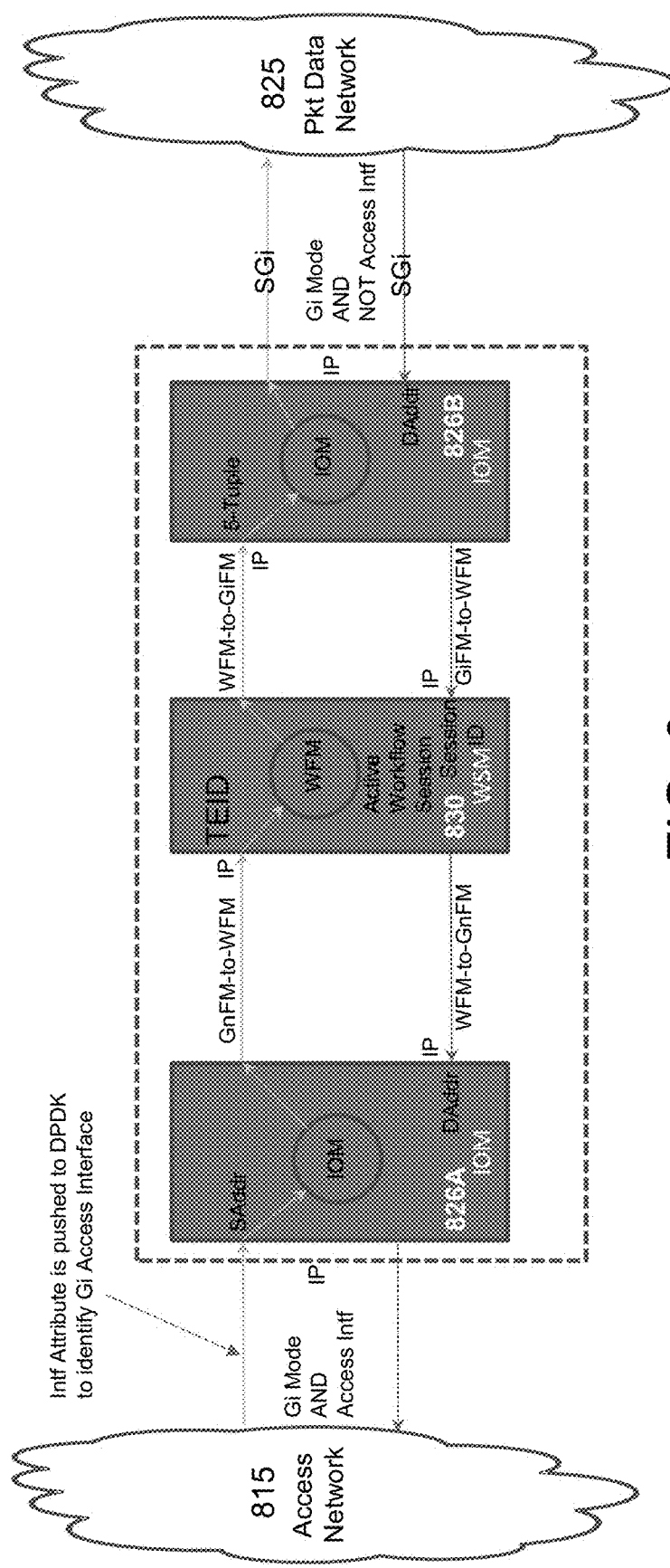
FIG. 8 is a diagram illustrating load balance hashing for non-proxy applications using the MCC as a "$G_i$" gateway, in accordance with some embodiments of the disclosed subject matter.

FIG. 8 is a diagram illustrating load balance hashing for non-proxy applications using the MCC as a "$G_i$," gateway (e.g., an internet-facing gateway that may provide, for example, value-added services known as "$G_i$ services"), in accordance with some embodiments of the disclosed subject matter. As shown in FIG. 8, a packet could be coming from either the access network side or the packet data network side. To disambiguate the source of the incoming data packets, the interface access attributes are passed, to identify whether the packets are arriving from the access side (in which case, a source address will be used for hashing) or from the internet/packet data network side (in which case, the destination address will be used for hashing). In some such implementations, a data packet originating from a UE passes from an access network 815 via a Gi access interface to an IOM 826A, identified using its source address ("SAddr") because the interface access attribute corresponds to packet that is coming from the access network. As part of this transfer, the interface attribute can be pushed to the DPDK to identify the Gi access interface. The packet is forwarded by the IOM 826A to a WFM on a WSM 830 (i.e., to the WSM 830's IP address), using a GnFM-to-WFM ether type, and is identified and routed to a processing core based on its TEID. The packet is forwarded by the WSM 830 to IOM 826B, (i.e., to the IOM 826B's IP address), using a WFM-to-GiFM ether type, where it is identified using a 5-tuple, and may be sent to a packet data network 825 for further processing before being returned to the IOM 826B, where it is identified using its DAddr. Continuing along its return path, the packet is forwarded by the IOM 826B to the WFM on WSM 830 using a GiFM-to-WFM ether type, and is identified and routed to a processing core based on using its Session ID. The packet is then passed from the WSM 830 back to the IOM 826A using WFM-to-GnFM before being returned to the access network 815 and the packet-originating UE.

Using Wi-Fi networks to extend network coverage and reduce traffic on the macrocellular network can have cost advantages for service providers. A trusted Wi-Fi network can be, for example, a hotspot that the service provider maintains (e.g., a hosted hotspot at an airport) or one deployed in partnership with the provider. The service provider can be a mobile or a fixed network operator. Cable provider Comcast, for example, currently offers both wireless voice and data services through thousands of wireless hotspots that it has deployed in the U.S.

A trusted network can be defined as a network in which the service provider can verify basic user information and exert some level of control over the access point. For example, Wi-Fi users can be authenticated by the service provider's Authentication, Authorization, and Accounting (AAA) system via the Trusted WLAN Proxy ("TWAP"), while the voice/data traffic itself could pass through the Trusted WLAN Access Gateway ("TWAG") and be offloaded onto the data network for backhaul. In some embodiments described herein, Gi services, such as policy enforcement (e.g., quality of service ("QoS") policies), content filtering, web/video optimization, and security services such as NAT, Firewall and internet protocol security ("IPSec"), are performed on subscriber-originated packets.

In some implementations, extending a subscriber's network experience—including value-added services and seamless session handoff—to trusted Wi-Fi networks involves tight integration with the service provider's core network. An example of trusted Wi-Fi access is wireless roaming at a large shopping mall, where mobile subscribers would seamlessly move from the macrocellular network outside the mall to the wireless LAN (WLAN) once inside the mall. In such a scenario, subscribers would enjoy better wireless reception indoor without the need to log on to the network or interrupt existing sessions. As discussed above, the TWAP could secure communications with the AAA server for authentication/authorization, while the TWAG would offload voice/data traffic (and, optionally, enforce policies on that traffic) onto the packet data network. However, not all traffic may be routed directly to the Internet. Certain traffic may be routed through the TWAG to the packet core network. Embodiments described herein can support the industry-standard S2a interface, which enables the TWAG to communicate directly with any industry-standard evolved packet core ("EPC") gateway, whether it is part of a local virtual EPC solution or an existing third-party EPC solution.

In a world with millions of Wi-Fi access points, untrusted Wi-Fi networks, in which the service provider cannot authenticate users or control the flow of traffic over the network, are a common occurrence. An example of an untrusted network could be a Wi-Fi network in a coffee shop or one hosted by a competitive provider. In some embodiments described herein, to facilitate bringing untrusted Wi-Fi networks into the core network, an evolved Packet Data Gateway ("ePDG") can be deployed.

Communications over untrusted networks can be protected with an added level of security known as internet protocol security ("IPSec") encryption. Industry standards mandate that all mobile devices must feature an IPSec client on the device. In such cases, voice and data sessions pass securely through an IPSec tunnel. These tunnels often need to remain open in anticipation of incoming or outgoing calls, so that at any given time millions of IPSec tunnels may need to remain open in the network. Hardware-based ePDGs are designed to handle this high demand for open IPSec tunnels, however these same high encryption requirements have historically proven problematic for virtualized ePDG instances. According to some embodiments described herein, robust virtual ePDGs are implemented, which can deliver 5G levels of IPSec-encrypted communications on a single server.

Figure 9:
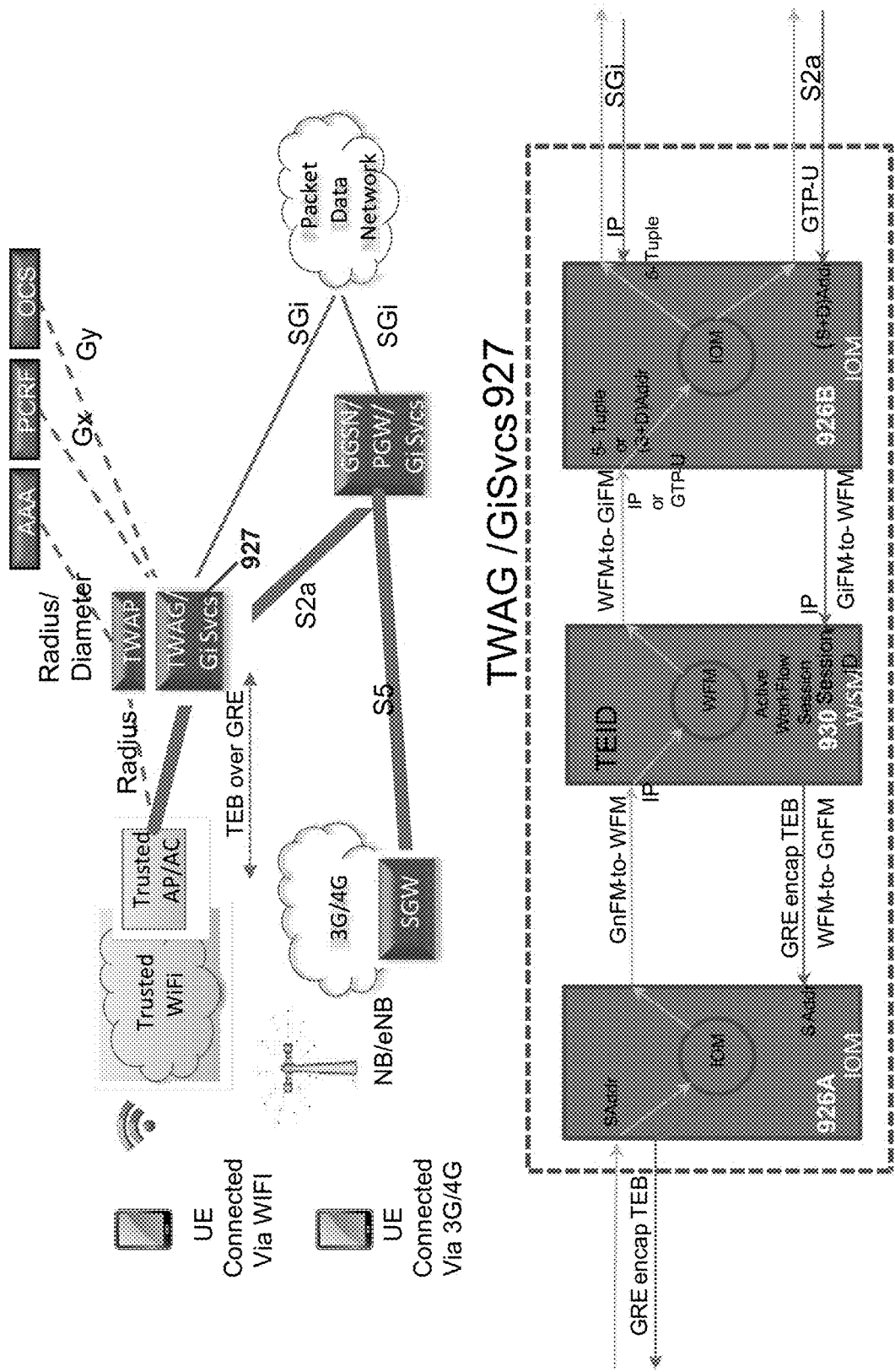
FIG. 9 is a diagram illustrating load balance hashing for non-proxy applications using a trusted wireless access gateway ("WAG"), in accordance with some embodiments of the disclosed subject matter.

FIG. 9 is a diagram illustrating load balance hashing for non-proxy applications using a trusted wireless access gateway ("WAG") with Gi services, in accordance with some embodiments of the disclosed subject matter. As shown in the upper portion of FIG. 9, a UE can be connected to the packet network through a trusted Wi-Fi connection or via a 3G/4G connection and transfer packets to the packet data network via a TWAG with Gi services ("GiSvcs") 927 (e.g., with AAA authentication via a TWAP) or SGW, respectively. The lower portion of FIG. 9 shows the processing, in a TWAG 927, of a data packet originating from a UE via an access network. The packet arrives at an IOM 926A via GRE encapsulated transparent Ethernet bridging ("TEB"), identified using its SAddr. The packet is forwarded by the IOM 926A to a WFM on a WSM 930 (i.e., to the WSM 830's IP address), using a GnFM-to-WFM ether type, and is identified and routed to a processing core based on its TEID. The packet is then forwarded by the WSM 930 to IOM 926B, (e.g., to the IOM 926B's IP address, or GTP-U tunneled), using a WFM-to-GiFM ether type, where it is identified using a 5-tuple or its source and destination addresses ("(Src+Dst)Addr"), and may be sent to a packet data network (depending upon the user configuration: (1) IP packet to the PDN directly if TWAG 927 is providing Gi services, or (2) if TWAG 927 is not providing Gi services, then via an S2A interface) for further processing before being returned to the IOM 926B, where it is identified using either its 5-tuple or its source and destination addresses, (Src+Dst) Addr. Continuing along its return path, the packet is forwarded by the IOM 926B to the WFM on WSM 930 using a GiFM-to-WFM ether type, and is identified and routed to a processing core based on its Session ID. The packet is then passed from the WSM 930 back to the IOM 926A using WFM-to-GnFM via GRE-encapsulated TEB, at which point the packet is identified by its SAddr before being returned to the access network and the packet-originating UE.

Figure 10:
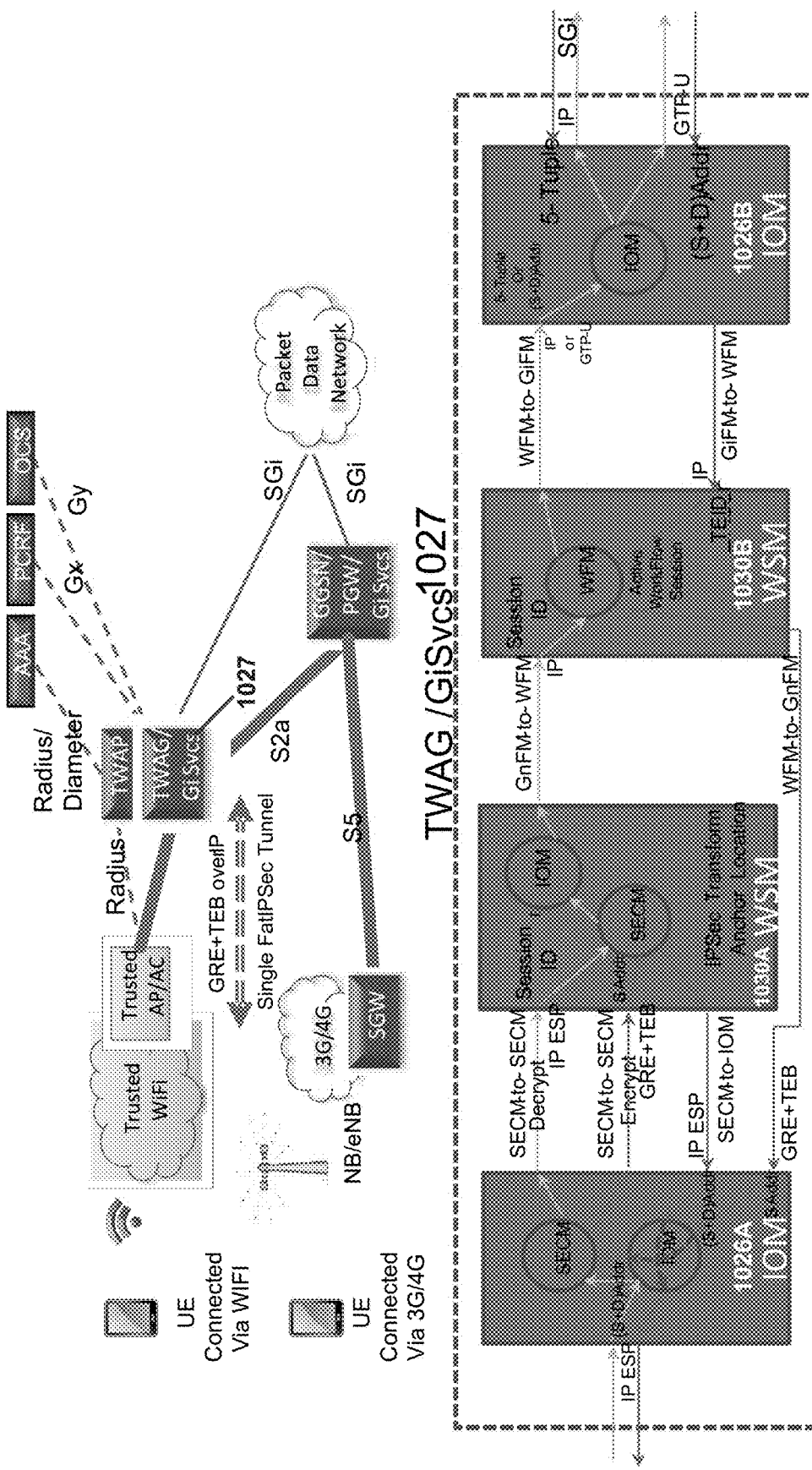
FIG. 10 is a diagram illustrating load balance hashing for non-proxy applications using a trusted WAG with internet protocol security ("IPsec") encryption, in accordance with some embodiments of the disclosed subject matter.

FIG. 10 is a diagram illustrating load balance hashing for non-proxy applications using a trusted WAG with internet protocol security ("IPSec") encryption, in accordance with some embodiments of the disclosed subject matter. As shown in the upper portion of FIG. 10, a UE can be connected to the packet network through a trusted Wi-Fi connection or via a 3G/4G connection and transfer packets to the packet data network via a TWAG with Gi services ("GiSvcs") 1027 (e.g., with AAA authentication via a TWAP) or SGW, respectively. The lower portion of FIG. 10 shows the processing, in a TWAG 1027, of a data packet originating from a UE from an access network to an IOM 1026A via IP encapsulating security payload ("ESP"), identified using its source and destination addresses, (Src+Dst) Addr. The packet is processed by a security module ("SECM") that is internal to the IOM 1026A before being forwarded by the IOM 1026A to another SECM on a WSM 1030A (i.e., to the WSM 1030's IP address) (i.e., SECM-to-SECM transfer) and IP encapsulating security payload ("IP ESP") protocols, and is identified and routed to a processing core based on its Session ID. Internally to the WSM 1030A, the packet is passed from the SECM to an IOM. The packet is then forwarded by the WSM 1030A to a WFM on WSM 1030B using GnFM-to-WFM, and is again identified and routed to a processing core based on its Session ID. The WSM 1030B passes the packet to IOM 1026B, (e.g., to the IOM 1026B's IP address, or GTP-U tunneled), using a WFM-to-GiFM ether type, where it is identified using a 5-tuple or its source and destination addresses, (Src+Dst)Addr, and may be sent to a packet data network for further processing before being returned to the IOM 1026B, where it is again identified using its 5-tuple or its (Src+Dst)Addr. Continuing along its return path, the packet is forwarded by the IOM 026B to the WFM on WSM 1030B using a GiFM-to-WFM ether type, and is identified and routed to a processing core based on its TEID. The packet is then passed from the WSM 1030B back to the IOM 026A using WFM-to-GnFM via GRE-encapsulated TEB, at which point the packet is identified by its SAddr. The packet is then redirected by the SECM of IOM 1026A to the SECM of WSM 030A by SECM-to-SECM transfer for encryption, and passed back to IOM 1026A via SECM-to-IOM before being returned to the access network and the packet-originating UE.

Figure 11:
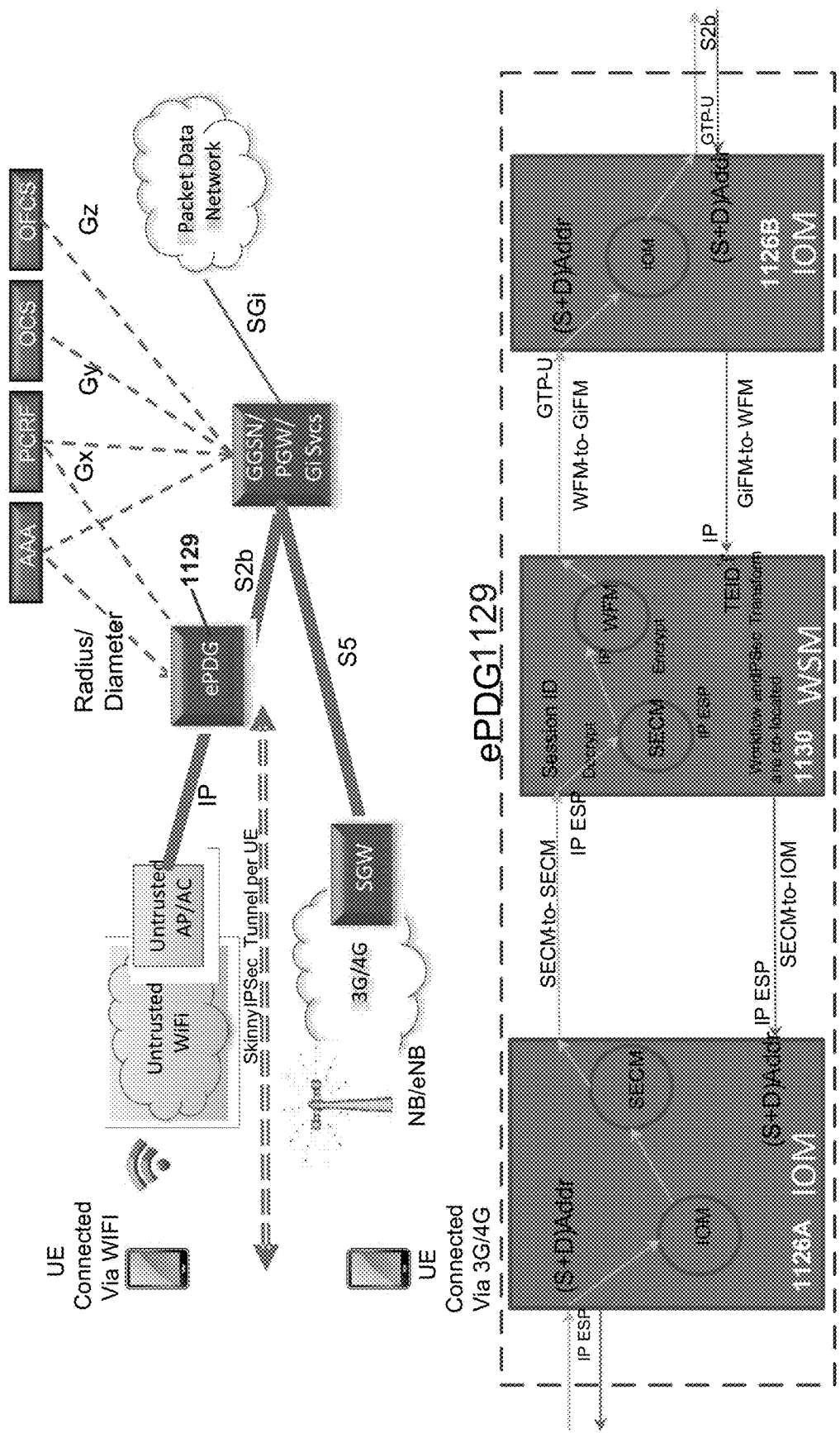
FIG. 11 is a diagram illustrating load balance hashing using an evolved packet data gateway ("ePDG"), in accordance with some embodiments of the disclosed subject matter.

FIG. 11 is a diagram illustrating load balance hashing using an ePDG, in accordance with some embodiments of the disclosed subject matter. As shown in the upper portion of FIG. 11, a UE can be connected to the packet network through an untrusted Wi-Fi connection or via a 3G/4G connection and transfer packets to the packet data network via an ePDG 1129. The lower portion of FIG. 11 shows the processing, in an ePDG 1129, of a data packet originating from a UE from an access network to an IOM 1126A using an IP ESP ether type, and is identified at IOM 1126A using its (Src+Dst)Addr. The IOM 1126A creates a session and maps a key value of the packet to its local session data to determine a Session ID. The packet is processed by an SECM internal to the IOM 1126A before being forwarded by the IOM 1126A to a SECM on a WSM 1130 (i.e., SECM-to-SECM transfer) using an IP ESP ether type, and is identified and routed to a processing core based on its Session ID and decrypted. Internally to the WSM 1130A, the packet is passed from the SECM to a WFM, where the Session ID can be used by the WFM for routing of the packet to a processing core. The packet is then forwarded by the WSM 1130 to IOM 1126B, (e.g., GTP-U tunneled), using a WFM-to-GiFM ether type, where it is identified and routed using its (Src+Dst)Addr, and may be sent to a packet data network for further processing before being returned to the IOM 1126B, where it is identified and routed using its (Src+Dst)Addr. Continuing along its return path, the packet is forwarded by the IOM 1126B to the WFM on WSM 1130 using a GiFM-to-WFM ether type, and is identified and routed using its TED. Internally to the WSM 1130A, the packet is passed from the WFM to the SECM for encryption, and IP ESP is applied. The packet is then passed from the WSM 1130 back to the IOM 1126A using SECM-to-IOM and IP ESP ether types, at which point the packet is identified and routed by its (Src+Dst)Addr before being returned to the access network and the packet-originating UE.

Figure 12:
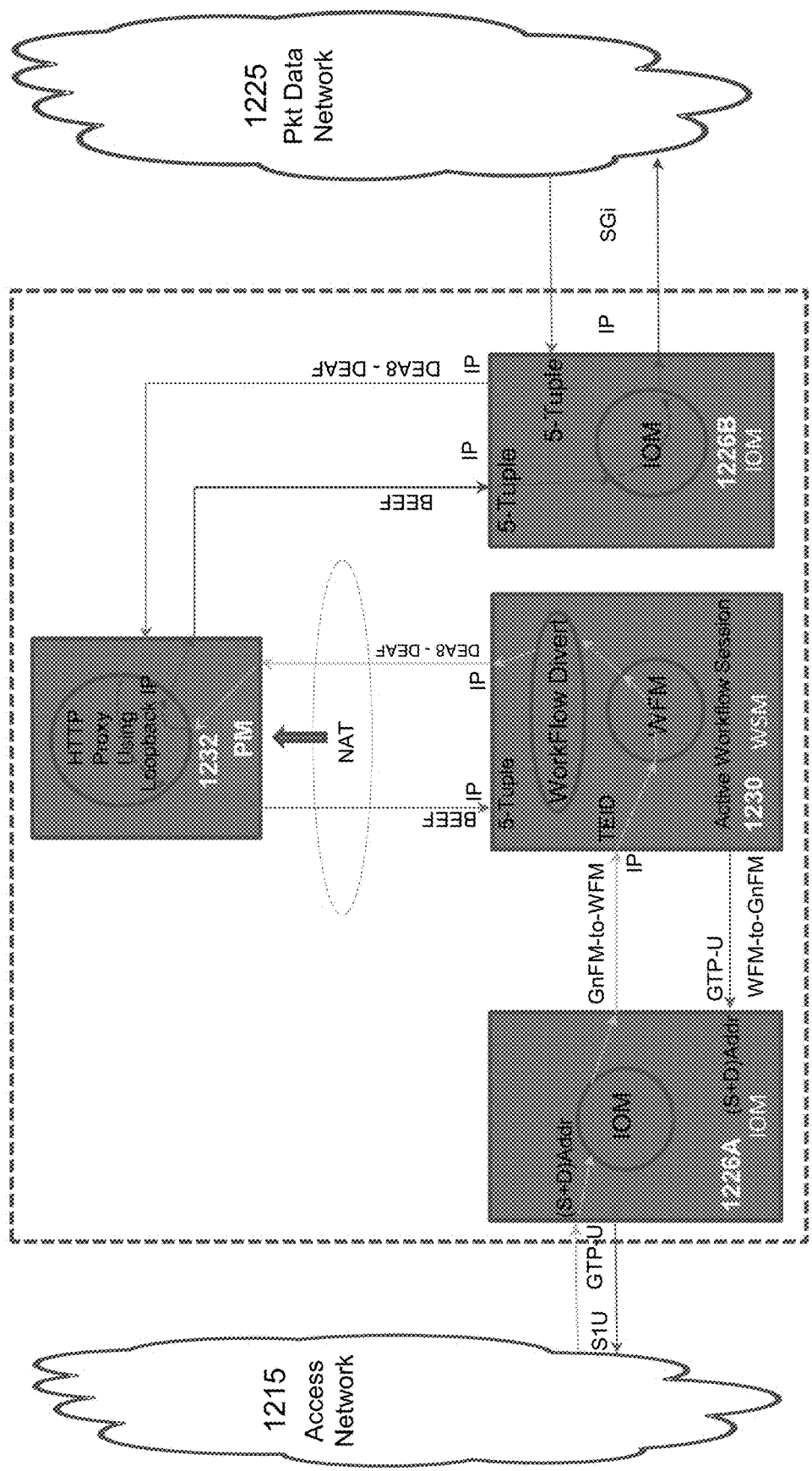
FIG. 12 is a diagram illustrating load balance hashing for proxy traffic applications, in accordance with some embodiments of the disclosed subject matter.

FIG. 12 is a diagram illustrating load balance hashing for proxy traffic applications, in accordance with some embodiments of the disclosed subject matter. As shown in FIG. 12, a data packet originating from a UE and arriving at an "S1 U" interface/port of an access network 1215 is GTP-U tunneled to an IOM 1226A, and is identified via a (Src+Dst)Addr. The packet is forwarded by the IOM 1226A to a WFM on a WSM 1230 (i.e., to the WSM 1230's IP address), using a GnFM-to-WFM ether type, and is identified by its TEID. At the WSM 1230, the TED is hashed for purposes of core selection. Internally to the WSM 1230, the packet is determined to need proxy service, and is passed from the WFM to a Workflow Divert module which performs a Network Address Translation ("NAT") in which packet traffic is diverted based on a mapping of a user source IP address and the destination MAC address that is being assigned to this packet (removing the UE IP address). Accordingly, when the packet returns from the PM, the Workflow Divert module can perform a reverse lookup and put the UE IP address back in. When diverting packet traffic, the Workflow Divert module passes the packet, having an ether type (e.g., DEA8-DEAF) to one or more service module blade PM proxy modules ("PM") 1232 for HTTP proxy service (and/or other services, such as video adaptation services). When the diverted packet arrives at the PM, the TCP connection can be terminated due to NAT (i.e., the PM recognizes the destination IP address as its own). When sending the packet from the WSM 1230 to the PM 1232, the WSM 1230 uses a "local" IP address instead of the UE IP address. This local IP address is generated via NAT translation by mapping the UE IP address to a local IP address. This serves as the source address (when leaving the WSM 1230) and as the destination address (when arriving at the WSM 1230 along the packet's return path), and the IP address includes core information in a subset of the bits thereof. In other words, the "local IP address" selected by the WSM 1230 is selected from a list of available IP addresses, and corresponds to the core that was selected by the WSM 1230 for the packet based on the hashing of the packet's TED.

The packet is forwarded by the PM 1232 to IOM 1226B (i.e., to the IOM 1226B's IP address), with a given ether type (e.g., "BEEF"), where it is identified using a 5-tuple and can be sent to a packet data network 1225 for further processing before being returned to the IOM 1226B, where it is again identified using a 5-tuple. Continuing along its return path, the packet is forwarded by the IOM 1226B to the HTTP proxy using a loopback IP address (e.g., an IP address that the PM uses so that the outside world can communicate with it, and so that packets loop back to the PM rather than the WSM) on PM 1232, with an ether type (e.g., DEA8-DEAF to indicate, to the IOM 1226B, that the packets are proxy packets). The packet is then routed from the PM 1232, with an ether type BEEF to indicate directionality of the packet (and, correspondingly, how the packet should be routed, processed, etc.), back to the Workflow Divert module of WSM 1230. In some implementations, WFM and WorkFlow divert module software are running on a common core (e.g., associated with TEID, session ID, etc.) such that the associated core will always be used. Before a MAC IP address is generated, core information can be embedded into the IP address to indicate which core generated the MAC packet that's being sent to the PM. The LB core can then recognize that it's a proxy packet (e.g., it can take ~7 bits to identify a core). Internally to the WSM 1230, the packet is passed from the Workflow Divert module to the WFM. The packet is GTP-U tunneled by the WSM 1230, using a WFM-to-GnFM ether type, to IOM 1226A where it is identified using its (Src+Dst)Addr before being returned to the access network 1215 (also via GTP-U tunneling) and the packet-originating UE.

Figure 13:
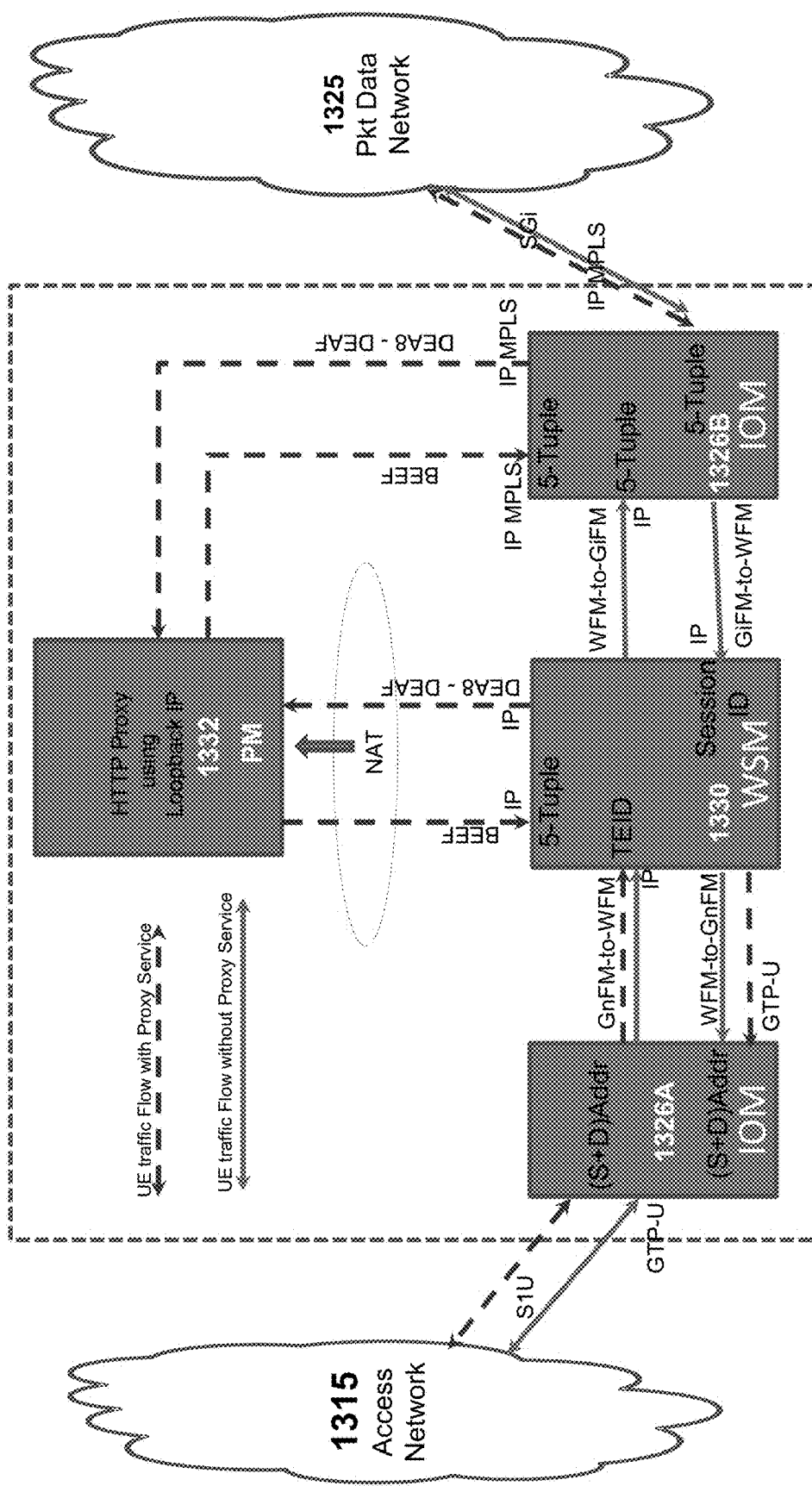
FIG. 13 is a diagram illustrating load balance hashing for proxy and non-proxy multiprotocol label switching ("MPLS") traffic applications, in accordance with some embodiments of the disclosed subject matter.

FIG. 13 is a diagram illustrating load balance hashing for both proxy and non-proxy multiprotocol label switching ("MPLS") traffic applications, in accordance with some embodiments of the disclosed subject matter. In some implementations of the embodiment depicted in FIG. 13, the WSM 1330 makes a determination regarding whether to divert a packet received from the IOM 1326A to the PM 1332 or not. As shown in FIG. 13, a data packet originating from a UE and arriving at an "S1 U" interface/port of an access network 1315 is GTP-U tunneled to an IOM 1326A, and is identified via a (Src+Dst)Addr. The packet is forwarded by the IOM 1326A to a WSM 1330 (i.e., to the WSM 1330's IP address), using a GnFM-to-WFM ether type, and is again identified and routed to a processing core based on its TEID.

Internally to the WSM 1330, if the packet is determined to need proxy service, the packet is passed from the WSM 1330 via DEA8-DEAF ether type to one or more PMs 1332 for HTTP proxy service, and a Network Address Translation ("NAT") is performed. Following the proxy path (indicated with a dashed line), the packet is forwarded by the PM 1332 to IOM 1326B (i.e., to the IOM 1326B's IP address), using a BEEF ether type and multiprotocol label switching ("MPLS"), where it is identified using a 5-tuple and can be sent from the IOM 1326B to a packet data network 1325 for further processing. Once returned to the IOM 1326B, the packet is again identified using a 5-tuple. Continuing along its return path, the packet is forwarded by the IOM 1326B to the HTTP proxy using loopback IP on PM 1332, using a DEA8-DEAF ether type. The packet is then routed from the PM 1332, using a BEEF ether type, back to the WSM 1330. The packet is GTP-U tunneled by the WSM 1330, using a WFM-to-GnFM ether type, back to IOM 1326A where it is identified using its (Src+Dst)Addr before being GTP-U tunneled back to the access network 1315 and the packet-originating UE.

If the northbound packet at the WSM 1330 is determined not to need proxy service, the packet is forwarded directly by the WSM 1330, using WFM-to-GnFM, to IOM 1326B (i.e., to the IOM 1326B's IP address) where it is identified using a 5-tuple and can be sent from the IOM 1326B to a packet data network 1325 for further processing. Once returned to the IOM 1326B, the packet is again identified using a 5-tuple. Continuing along its return path, the packet is forwarded by the IOM 1326B, using GiFM-to-WFM, to the WSM 1330 where it is identified and routed to a processing core based on its Session ID. As in the proxy return path, the packet is then GTP-U tunneled by the WSM 1330, using a WFM-to-GnFM ether type, back to IOM 1326A where it is identified using its (Src+Dst)Addr before being GTP-U tunneled back to the access network 1315 and the packet-originating UE.

Figure 20:
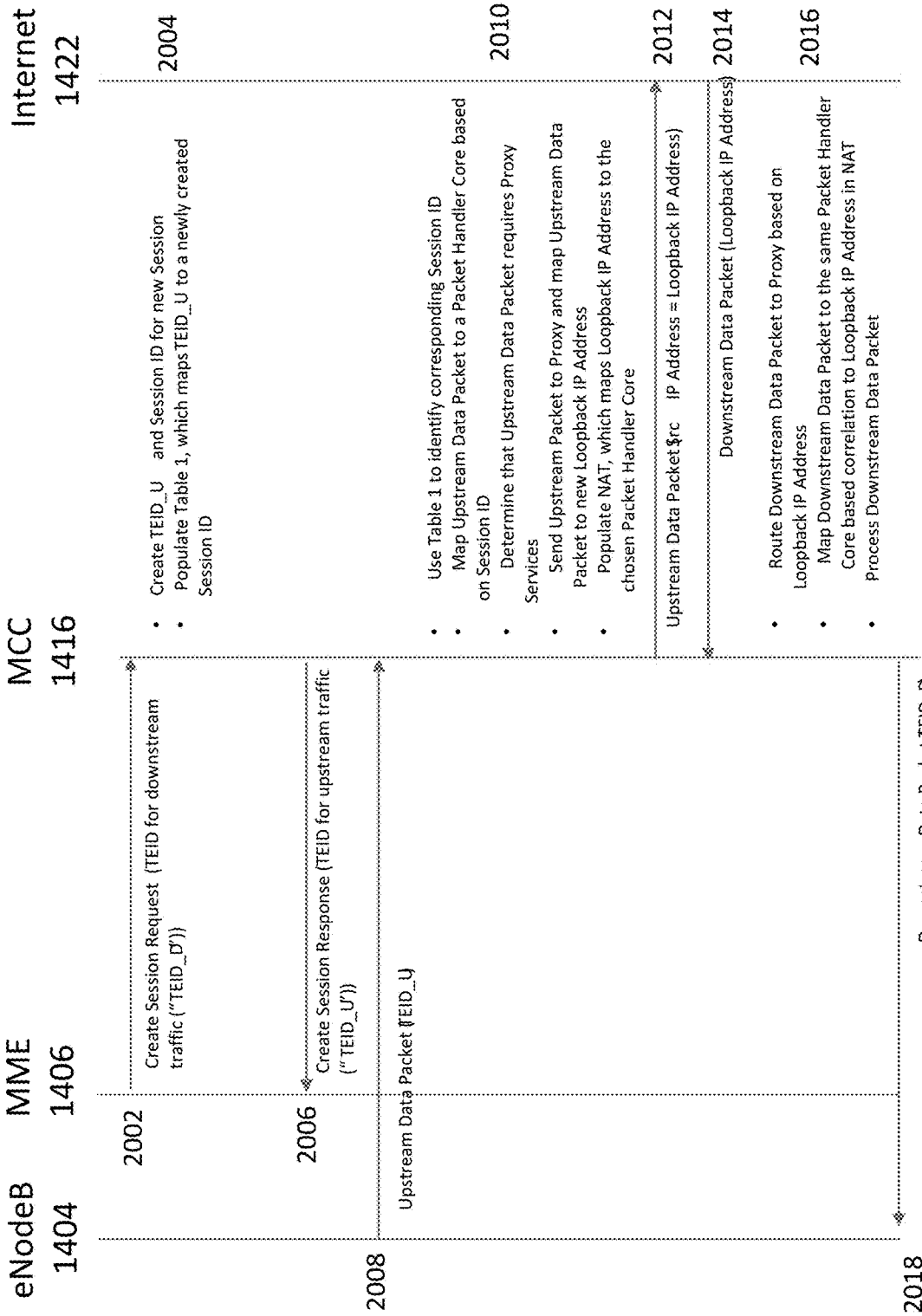
FIG. 20 is a flow chart illustrating a method for processing data packets involving proxy services, according to some embodiments of the disclosed subject matter.

FIG. 20 illustrates a flow diagram according to some embodiments involving proxy services as described above. In Step 2002, MCC 1416 receives from MME 1406 a request to create a session for a user device. The request includes a TEID that MCC 1416 will later use for downstream traffic directed to the user device (designated "TEID_D"). In Step 2004, MCC 1416 creates a TED that is associated with a new session and that will be used by the eNodeB 1404/MME 1406 for upstream traffic associated with the user device (designated "TEID_U"). MCC 1416 also creates a Session ID that is associated with the new session. In some embodiments, the TEID_U and the Session ID share a common value. For example, the first 24 bits of the TEID_U may match the first 24 bits of the Session ID. Once the TEID_U and Session ID are created, MCC 1416 notifies all IOMs within MCC 1416 that the newly created TEID_U corresponds to the newly created Session ID. In some embodiments, individual IOMs may keep a record of this information in a table.

In Step 2006, MCC 1416 receives an Upstream Data Packet from eNodeB 1404. The Upstream Data Packet includes the TEID_U previously established. In Step 2010, MCC 1416 identifies the session ID corresponding to TEID_U. In some embodiments, an IOM identifies the session ID by using the TEID_U as an index into a table. The IOM will then select a Workflow Service Module ("WSM") based on the Session ID for processing the Upstream Data Packet and route the Upstream Data Packet to the selected WSM. The WSM chooses a specific Packet Handler Core ("PHC") based on the Session ID. In some embodiments, a hashing algorithm is used to distribute the Upstream Data Packet to a PHC based on the Session ID.

MCC 1416 determines that the Upstream Data Packet requires Proxy Services. For example, the Upstream Data Packet may require special video encoding, access to cached content, SMTP, and other proxy services. A Proxy Service Module may be used to enhance the processing of this data. MCC 1416, may then terminate the existing IP call and create a new Loopback IP Address for communication with, for example, an external packet data network. The Loopback IP Address will be used as the source address for outgoing traffic related to the user device, and as a destination address for incoming traffic related to the user device. MCC 1416 then maps the Loopback IP Address to an identifier corresponding to the chosen Packet Handler Core and optionally stores this correlation in a Network Address Translation Table ("NAT").

In Step 2012, the Upstream Data Packet is transmitted to Internet 1422 using the Loopback IP Address as the source ip address. In Step 2014, a Downstream Data Packet is received with the Loopback IP Address as the destination address. In Step 2016, MCC 1416 routes the Downstream Data Packet to a Proxy Service Module based on the Loopback IP Address. MCC 1416 uses the correlation stored in the NAT to map the Downstream Data Packet to the chosen Packet Handler Core based on the Loopback IP Address. In Step 2018, the Downstream Data Packet is routed back to the eNodeB 1404 using TED D.

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A computing system for sending packets to a packet handler core in a communications system comprising:
   a processor; and
   a memory coupled to the processor and including computer-readable instructions that, when executed by the processor, cause the processor to:
      receive a request to create a session wherein the request corresponds to a subscriber, allocate a downstream identifier and an upstream identifier to the session,
      receive a data packet including the downstream identifier or the upstream identifier, determine if the data packet requires a proxy service, and
      when it is determined that the data packet does not require the proxy service:
         associate the downstream identifier and the upstream identifier to a session identifier, the session identifier uniquely identifying the session,
         identify the session identifier associated with the data packet based on the downstream identifier or the upstream identifier,
         route the data packet to the packet handler core based on the session identifier, and
      when it is determined that the data packet requires a proxy service:
         identify a proxy service for the data packet,
         route the data packet to the proxy service,
         correlate an identifier for the packet handler core with the downstream identifier, and
         route the data packet to the packet handler core based on the identifier for the packet handler core.

2. The computing system of claim 1, wherein the upstream identifier includes a Tunnel Endpoint Identifier ("TEID") or an encryption key.

3. The computing system of claim 2, wherein the processor is further caused to encrypt or decrypt the data packet using the encryption key.

4. The computing system of claim 1, wherein the downstream identifier includes one of a user equipment ("UE") Internet Protocol ("IP") address or a TEID.

5. The computing system of claim 1, wherein upstream identifier and downstream identifier share a common value.

6. The computing system of claim 5, wherein the common value comprises a first 24-bit portion of the upstream identifier and downstream identifier.

7. The computing system of claim 1, wherein the processor is further caused to apply a hashing algorithm to the session identifier to determine the packet handler core.

8. A method for sending packets to a packet handler core in a communications system comprising:
   receiving, by a computing device, a request to create a session wherein the request corresponds to a subscriber,
   allocating, by the computing device, a downstream identifier and an upstream identifier to the session,
   receiving, by the computing device, a data packet including the downstream identifier or the upstream identifier,
   determining if the data packet requires a proxy service, and
   when it is determined that the data packet does not require the proxy service:
   associating, by the computing device, the downstream identifier and the upstream identifier to a session identifier, the session identifier uniquely identifying the session,
   identifying, by the computing device, the session identifier associated with the data packet based on the downstream identifier or the upstream identifier,
   routing, by the computing device, the data packet to a packet handler core based on the session identifier, and
   when it is determined that the data packet requires a proxy service:
   identifying a proxy service for the data packet,
   routing the data packet to the proxy service,
   correlating an identifier for the packet handler core with the downstream identifier, and
   routing the data packet to the packet handler core based on the identifier for the packet handler core.

9. The method of claim 8, wherein the upstream identifier includes a Tunnel Endpoint Identifier ("TEID") or an encryption key.

10. The method of claim 8, further comprising one or more of encrypting or decrypting the data packet using the encryption key.

11. The method of claim 8, wherein the downstream identifier includes one of a user equipment ("UE") Internet Protocol ("IP") address or a TEID.

12. The method of claim 8, wherein upstream identifier and downstream identifier share a common value.

13. The method of claim 12, wherein the common value comprises a first 24-bit portion of the upstream identifier and downstream identifier.

14. The method of claim 8, further comprising applying a hashing algorithm to the session identifier to determine the packet handler core.

15. A computing system for sending packets to a packet handler core in a communications system comprising:
- a processor; and
- a memory coupled to the processor and including computer-readable instructions that, when executed by the processor, cause the processor to:
  - receive a request to create a session wherein the request corresponds to a subscriber,
  - allocate a downstream identifier and an upstream identifier to the session,
  - associate the downstream identifier and the upstream identifier to a session identifier, the session identifier uniquely identifying the session,
  - receive a data packet including the downstream identifier or the upstream identifier,
  - determine that the data packet requires a proxy service,
  - determine whether the data packet includes the downstream identifier or the upstream identifier, whereby,
  - when the data packet includes the upstream identifier, identify the session identifier associated with the data packet based on the upstream identifier, and route the data packet to a packet handler core based on the session identifier, and
  - when the data packet includes the downstream identifier, route the data packet to the packet handler core based on the downstream identifier, and further based on a determination of whether the data packet is system-initiated traffic from the proxy service or downstream subscriber traffic using a partitioned multi-protocol label switching ("MPLS") label space split into a UE Pool Address Domain and a Proxy Loopback Address Domain.

16. The computing system of claim 15, wherein the downstream identifier includes a UE Loopback IP Address.

17. The computing system of claim 15, wherein the upstream identifier includes a TEID.

18. A method for sending packets to a packet handler core in a communications system comprising:
- receiving, by a computing device, a request to create a session wherein the request corresponds to a subscriber,
- allocating, by the computing device, a downstream identifier and an upstream identifier to the session,
- associating, by the computing device, the downstream identifier and the upstream identifier to a session identifier, the session identifier uniquely identifying the session,
- receiving, by the computing device, a data packet including the downstream identifier or the upstream identifier,
- determining, by the computing device, that the data packet requires a proxy service,
- determining, by the computing device, whether the data packet includes the downstream identifier or the upstream identifier, whereby,
- when the data packet includes the upstream identifier, identify the session identifier associated with the data packet based on the upstream identifier, and route the data packet to a packet handler core based on the session identifier, and
- when the data packet includes the downstream identifier, route the data packet to the packet handler core based on the downstream identifier, and further based on a determination of whether the data packet is system-initiated traffic from the proxy service or downstream subscriber traffic using a partitioned multi-protocol label switching ("MPLS") label space split into a UE Pool Address Domain and a Proxy Loopback Address Domain.

19. The method of claim 18, wherein the downstream identifier includes a UE Loopback IP Address.

20. The method of claim 18, wherein the upstream identifier includes a TEID.

* * * * *